US008107418B2

(12) United States Patent
Oh

(10) Patent No.: US 8,107,418 B2
(45) Date of Patent: Jan. 31, 2012

(54) MOBILE COMMUNICATION SYSTEM, MOBILE STATION APPARATUS, BASE STATION APPARATUS, MOBILE COMMUNICATION METHOD, PROGRAM AND RECORDING MEDIUM

(75) Inventor: Wahoh Oh, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1016 days.

(21) Appl. No.: 11/996,738

(22) PCT Filed: Jul. 25, 2006

(86) PCT No.: PCT/JP2006/314677
§ 371 (c)(1),
(2), (4) Date: Jan. 24, 2008

(87) PCT Pub. No.: WO2007/013457
PCT Pub. Date: Feb. 1, 2007

(65) Prior Publication Data
US 2010/0284326 A1 Nov. 11, 2010

(30) Foreign Application Priority Data
Jul. 27, 2005 (JP) ................................. 2005-217296

(51) Int. Cl.
*H04W 4/00* (2009.01)
(52) U.S. Cl. ...................................................... 370/328
(58) Field of Classification Search .................. 370/328, 370/342, 350, 352, 335, 338, 341, 329, 333, 370/392, 330, 343; 455/67.11, 423, 502, 455/522, 67.1, 450, 509, 513, 426
See application file for complete search history.

(56) References Cited

U.S. PATENT DOCUMENTS

| 6,993,294 | B2 * | 1/2006 | Nobukiyo et al. ......... 455/67.11 |
| 7,356,022 | B2 * | 4/2008 | Takano et al. ................. 370/350 |
| 2004/0125766 | A1 | 7/2004 | Takano et al. |
| 2005/0174982 | A1 | 8/2005 | Uehara et al. |

FOREIGN PATENT DOCUMENTS
EP 1414201 A1 4/2004
(Continued)

OTHER PUBLICATIONS

Ue et al., IEEE Transactions of Vehicular Technology, vol. 47, No. 4, pp. 1134-1147, (1998).
HSPDA Specification of 3GPP TR (Technical Report) 25.858, http://www.3gpp.org/ftp/Specs/html-info/25-series.htm.
(Continued)

*Primary Examiner* — Chi Pham
*Assistant Examiner* — Alexander Boakye
(74) *Attorney, Agent, or Firm* — Birch, Stewart, Kolasch & Birch, LLP

(57) ABSTRACT

A mobile communication system that is a wireless communication system using the AMC scheme and does not require any transmission/reception of control signals between a base station apparatus and a mobile station apparatus during controlling of the transmission/reception of the mobile station apparatus. In this mobile communication system, the mobile station apparatus measures reception quality of a downlink signal transmitted by the base station apparatus, and uses an uplink control channel to transmit, to the base station apparatus, downlink signal quality information (CQI) corresponding to the measured reception quality. The base station apparatus receives the downlink signal quality information CQI to control the data transmission to the mobile station apparatus. The base station apparatus judges whether the downlink signal quality information CQI transmitted by the mobile station apparatus is present, and controls, based on the result of this judgment, the downlink signal to be transmitted to the mobile station apparatus.

23 Claims, 14 Drawing Sheets

FOREIGN PATENT DOCUMENTS

| | | |
|---|---|---|
| EP | 1487144 A1 | 12/2004 |
| JP | 2003-199173 A | 7/2003 |
| JP | 2004-134898 A | 4/2004 |
| JP | 2004-134898 A | 4/2004 |
| JP | 2004-147049 A | 5/2004 |
| JP | 2004-147049 A | 5/2004 |
| JP | 2004-289234 A | 10/2004 |

OTHER PUBLICATIONS

Keiji Tachikawa, "W-CDMA Mobile Communication Systems," ISBN4-621-04894-5, pp. 114-115, (2001).
European Supplemental Search Report dated May 19, 2011 for corresponding European Application EP06781589.4.

* cited by examiner

FIG. 12

| MCS MODE | MODULATION SCHEME | CODING RATE | TRANSMISSION RATE |
|---|---|---|---|
| Mode 1 | 64QAM | 3/4 | 10.8Mbps |
| Mode 2 | 16QAM | 3/4 | 7.2Mbps |
| Mode 3 | 16QAM | 1/2 | 4.8Mbps |
| Mode 4 | QPSK | 1/2 | 2.4Mbps |
| Mode 5 | QPSK | 1/4 | 1.2Mbps |

MOBILE COMMUNICATION SYSTEM, MOBILE STATION APPARATUS, BASE STATION APPARATUS, MOBILE COMMUNICATION METHOD, PROGRAM AND RECORDING MEDIUM

TECHNICAL FIELD

The present invention relates to a mobile communication system, a mobile station apparatus, a base station apparatus, and a mobile communication method, and a program and a recording medium, and more particularly to a packet data communication scheme that has an adaptive modulation/demodulation and correction scheme (AMCS: Adaptive Modulation and Coding Scheme) as an HSDPA (High-Speed Downlink Packet Access) service in a mobile communication system.

BACKGROUND OF THE INVENTION

Conventionally, in the HSDPA service, a technique such as an adaptive modulation/demodulation and correction scheme (AMCS: hereinafter, "AMC scheme") based on adaptive wireless link control (link adaptation) such as channel encoding proposed in Non-Patent Document 1, etc., is applied.

The AMC scheme is a scheme according to which wireless transmission parameters such as the number of data modulation multiple values, a correction scheme, an encoding rate of the correction, the number of data modulation multiple values, the code spreading rate (SF: Spreading Factor) of the time and frequency axes, the number of multiple code multiplex are switched corresponding to the state of the transmission path of each user to efficiently execute the high-speed packet data transmission.

For example, as to the data modulation, as the state of the transmission path becomes better, the maximum throughput of the communication system can be increased by switching the modulation of the system from a QPSK (Quadrature Phase Shift Keying) modulation to a more efficient multiple-value modulation such as an 8 PSK modulation, a 16 QAM (Quadrature Amplitude Modulation) modulation. Herein, various wireless transmission parameter sets used for the AMC scheme are referred to as "MCS (Modulation and Coding Scheme) mode". An example of the MCS mode is shown in FIG. 12.

As shown in FIG. 13, in an HSDPA (see Non-Patent Document 2), a downlink pilot channel 3, a downlink common control channel 4, a downlink shared control channel 5, a downlink shared data channel 6, an uplink control channel 7, an uplink data channel 8, etc., are present.

One downlink pilot channel 3 is present in each cell 9 and includes a common pilot channel (CPICH: Common Pilot Channel) and a dedicated pilot channel (DPICH: Dedicated Pilot Channel).

One downlink common control channel 4 is present in each cell and includes a reporting information, paging information (a paging indicator channel, a paging channel), synchronization information (a synchronization channel), etc., of a base station apparatus 1.

One downlink shared control channel 5 is present in each cell and includes and time-division-multiplexes (TDM: Time Division Multiplex) individual control information, etc., to each mobile station apparatus 2 (each user).

One downlink shared data channel 6 is present in each cell and time-division-multiplexes individual transmission data, etc., to each mobile station apparatus.

The uplink control channel 7 includes an uplink dedicated control channel, and control information, measurement and reporting information, etc., from the mobile station apparatus are transmitted thereon.

The uplink data channel 8 includes an uplink dedicated data channel, and transmission data from the mobile station apparatus is transmitted thereon.

Referring to FIG. 14, description will be given for a flow of signals between the base station apparatus and the mobile station apparatus in the HSDPA. As shown in FIG. 14, when a wireless link is established between the mobile station apparatus and the base station apparatus, the mobile station apparatus always receives an HS-SCCH (High Speed Shared Control CHannel) that is one of downlink shared control channels, detects information on a mobile station apparatus ID (UE ID: User Equipment IDentifier) contained in an MCS field of sub-frame control information of the downlink shared control channel HS-SCCH, and judges whether the ID coincides with the mobile station apparatus ID of the own mobile station.

When the mobile station apparatus has detected the mobile station apparatus ID of the mobile station on the downlink shared control channel HS-SCCH: the mobile station apparatus receives a sub-frame of an HS-DSCH (High Speed Downlink Shared CHannel) contained in a downlink shared data channel HS-PDSCH (High Speed Physical Downlink Shared Channel) that is one of downlink shared data channels, that has been transmitted being delayed by a predetermined time delay (Delay 1) from the head of a sub-frame of the downlink shared control channel HS-SCCH, using MCS mode information contained in an MCS information field of the sub-frame control information transmitted on the downlink shared control channel HS-SCCH; and executes data demodulation according to the designated MCS mode information.

When user data to be transmitted occurs, the mobile station apparatus transmits the data through a DPCH (Dedicated Physical CHannel) that is an uplink dedicated data channel.

The mobile station apparatus measures the reception quality of the common pilot channel CPICH contained in the downlink common control channel of the base station apparatus, that represents the state of a downlink transmission path (downlink wireless transmission path property estimation or channel estimation). Downlink signal quality information CQI (Channel Quality Indication) judged from the result of the downlink wireless transmission path property estimation is provided as feedback to the base station apparatus through an HS-DSCH (High Speed Downlink Shared CHannel) sub-frame of an uplink dedicated control channel HS-DPCCH (High Speed Dedicated Physical Control Channel).

The base station apparatus selects an appropriate MCS mode according to this downlink signal quality information CQI and transmits the data in the AMC scheme.

Because the HSDPA employs hybrid automatic re-transmission (HARQ: Hybrid Automatic Repeat reQuest), the mobile station apparatus transmits ACK/NACK (Acknowledgement/Negative Acknowledgements) that is the received notice acknowledgement information through an HARQ information field of an HS-DSCH sub-frame of the HS-DPCCH.

The above mobile station apparatus in an HSDPA needs to receive control information (downlink shared control channel) that indicates whether the data is addressed to the own station even when the mobile station apparatus is standing by for data during the packet communication. Therefore, electric power is always consumed by a receiving portion because the receiving portion can not execute intermittent reception (DRX) operation even when data reception time is short.

Because the AMC scheme is employed, the mobile station apparatus needs to always provide the downlink signal quality information CQI as feedback to the base station apparatus. Therefore, the electric power is always consumed by the transmitting portion. Especially, a high-speed data transmitting scheme such as the HSDPA is often used for services for which data downloading is repeated intermittently such as WEB viewing. Therefore, the power consumption of the mobile station apparatus becomes much even when the time for transmitting/receiving data is short.

To solve this problem, as shown in Patent Document 1, a method has been proposed according to which a base station apparatus has a means of notifying a mobile station apparatus of transmission/reception state updating information that indicates update of the state of whether the mobile station apparatus can receive data, and the mobile station apparatus controls the data transmission/reception state based on the transmission/reception state updating information.

As shown in Patent Document 2, a controlling method has been proposed according to which a base station apparatus includes a means of setting a downlink shared control channel with a mobile station apparatus and transmitting a data transmission notice to the mobile station apparatus, and the mobile station apparatus includes a means of responding to the data transmission notice during setting of an uplink control channel and starting transmission of downlink signal quality information CQI at predetermined intervals to the base station apparatus.

As shown in Patent Document 3, a method has been proposed according to which a mobile station apparatus or a base station apparatus judges a monitoring method based on the data amount and the mobile station apparatus controls the data transmission/reception state by notifying the counterpart of the monitoring information.

On the other hand, in the HSDPA, the downlink common control channel includes the paging indicator Channel PICH (Paging Indicator CHannel), a downlink primary common control PCCPCH (Primary Common Control Physical CHannel), and a downlink secondary common control channel SCCPCH (Secondary Common Control Physical CHannel).

The paging indicator channel PICH is a channel that is set with a purpose of reducing the intermittent reception rate to improve the battery saving of the mobile station apparatus. The paging indicator channel PICH transmits a short paging indicator PI (Paging Indicator) to notify the mobile station apparatus of the presence or the absence of arrival of transmission. The mobile station apparatus that is standing by receives only this paging indicator PI during the intermittent reception period thereof. Only when the paging indicator PI reports the presence of arrival of transmission, the mobile station apparatus receives a paging channel PCH (Paging CHannel) in a wireless frame on the downlink secondary common control channel SCCPCH, that corresponds to the paging indicator PI. Paging indicators PI are grouped into a plurality of groups that each are group of mobile station apparatuses, and the frequency of transmission arrival per one group can be reduced to a very low level. Therefore, the mobile station apparatus that is standing by has to receive only a short paging indicator PI and the frequency of receiving a long paging channel PCH can be reduced to a very low level (see Non-Patent Document 3).

In the HSDPA, when the power of the mobile station apparatus is turned on, before entering a soft handover mode or in an intermittent reception mode while standing by for communication, the mobile station apparatus needs to detect a cell with which path loss caused by long-section variation and shadowing variation obtained by averaging momentary fading variation is minimal (before entering the soft handover mode, a cell with which this path loss is second minimal). This is a process of detecting a cell that has a scramble code of a common pilot channel CPICH for which power for receiving is largest in the downlink. This process is referred to as "cell search" meaning to search a cell to be connected to a wireless link (see Non-Patent Document 3).

In a cell search in the intermittent reception mode (idle mode) during standing by, through a paging channel PCH in a wireless frame on the downlink secondary common control channel SCCPCH, the mobile station apparatus receives information on the types of scramble codes of the cell which is connected to a wireless ring or receives the paging channel PCH in the intermittent reception mode and surrounding cells to be searched (about 20 cells), and on the difference in scramble code timing of the common pilot channel CPICH between the cell being connected and the surrounding cells.

Therefore, for the mobile station apparatus, the types of the scramble codes of the surrounding cells to be searched and the average reception timing of the common pilot channel CPICH at the mobile station apparatus are known. Therefore, a search for the surrounding cells in a short time is enabled. In the intermittent reception mode during standing by, generally, reception of the paging indicator channel PICH and the cell search are simultaneously executed (see Non-Patent Document 3).

Patent Document 1: Japanese Laid-Open Patent Publication No. 2004-147049
Patent Document 2: Japanese Laid-Open Patent Publication No. 2003-199173
Patent Document 3: Japanese Laid-Open Patent Publication No. 2004-289234
Non-Patent Document 1: T. Ue, S. Sampei, and N. Morinaga, "Symbol Rate and Modulation Level-Controlled Adaptive Modulation/TDMA/TDD system for High-Bit-Rate Wireless Data Transmission", IEEE Transaction, VT, pp. 1134-1147, Vol. 47, no. 4, Nov. 1998
Non-Patent Document 2: Reference related to HSDPA specification of 3GPP TR (Technical Report) 25. 858 and 3GPP http://www.3gpp.org/ftp/Specs/html-info/25-series.htm
Non-Patent Document 3: Keiji Tachikawa, "W-CDMA Mobile Communication Systems", ISBN4-621-04894-5, P114

DISCLOSURE OF THE INVENTION

Problems to be Solved by the Invention

However, according to the technique of Patent Document 1, the transmission/reception state updating information that indicates the update of the state of whether the data can be received is transmitted to the mobile station apparatus for the problem that, even when the time for receiving the data during the packet communication is short, circuit control of a transmitting/receiving portion of the mobile station apparatus can not be executed such that the power consumption can be reduced, and the power consumption of the mobile station apparatus is much.

According to the technique of Patent Document 2, permission or rejection of the transmission of the downlink signal quality information CQI is controlled according to the base station apparatus data transmission notice.

According to the technique of Patent Document 3, the mobile station apparatus or the base station apparatus judges the monitoring method based on the data amount and notifies the counterpart thereof of the monitor information.

In all of the above three techniques, the base station apparatus or the mobile station apparatus needs to transmit a control signal to the counterpart thereof, and the base station apparatus and the mobile station apparatus each need the control signal processing.

In the technique of Patent Document 2, the effect of power reduction is low because the base station apparatus data transmission notice is always received.

The present invention has been made taking into account the above circumstances and the object thereof is to provide a mobile communication system that is a wireless communication system using the AMC scheme and needs no transmission/reception of any control signal between a base station apparatus and a mobile station apparatus for transmission/reception control of the mobile station apparatus; a mobile station apparatus and a base station apparatus, a mobile communication method, and a program and a recording medium of the mobile communication system.

Means for Solving the Problems

To solve the above problems, the present invention takes the following configuration.

The present invention is a mobile communication system that includes a base station apparatus and a mobile station apparatus, the base station apparatus transmits a downlink signal comprising a downlink pilot channel, a downlink common control channel, a downlink shared control channel, and a downlink shared data channel, the mobile station apparatus sets an uplink control channel with the base station apparatus, measures reception quality of the downlink signal and transmits downlink signal quality information CQI corresponding to the reception quality to the base station apparatus using the uplink control channel, the base station apparatus controls transmission of data to the mobile station apparatus using the downlink signal quality information CQI, wherein the mobile station apparatus comprises a reception data judging means that judges whether data addressed to the own station contained in the downlink signal transmitted by the base station apparatus is present, and a reception control means that enters an intermittent reception mode that stops transmission of the downlink signal quality information CQI, causes a receiving portion to operate during a pre-defined intermittent reception period, and stops the operation of the receiving portion in periods other than the pre-defined intermittent reception period, when the reception data judging means judges that no data addressed to the own station from the base station apparatus is present, and wherein the base station apparatus comprises a downlink signal quality information CQI judging means that judges whether the downlink signal quality information CQI transmitted from the mobile station apparatus is present, and a downlink signal control means that transmits the downlink signal to the mobile station apparatus during an intermittent receivable period when the downlink signal quality information CQI judging means judges that the downlink signal quality information CQI is not present and data addressed to the mobile station apparatus is present in an RLC packet data buffer.

This mobile station apparatus further has the following configuration.

The transmission/reception data judging means judges whether data is present that is addressed to the own station contained in the downlink signal transmitted by the base station apparatus and/or whether transmission data is present in a transmission data buffer.

When the transmission/reception data judging means of the mobile station apparatus judges that no data is present that is addressed to the own station from the base station apparatus, the transmission/reception control means causes the mobile station apparatus to stop transmitting the downlink signal quality information CQI and causes the operation of the receiving portion to stop. When no data addressed to the own station from the base station apparatus is present and no transmission data in the transmission buffer is present, the transmission/reception control means further causes the operation of the transmitting portion to stop.

The reception control means of the mobile station apparatus causes the receiving portion to operate during the pre-defined intermittent reception period of the mobile station apparatus, for example, during a receiving period of the paging information addressed to the own station defined on the downlink common control channel and/or the downlink shared control channel, and/or the cell search period, and when the reception data judging means judges that the data addressed to the own station is present, causes the receiving portion to operate during periods other than the pre-defined intermittent reception period, receives the data addressed to the own station, and restarts the uplink transmission of the downlink signal quality information CQI.

Otherwise, when the transmission/reception data judging means of the mobile station apparatus causes the receiving portion of the mobile station apparatus to stop, the transmission/reception control means has an intermittent reception mode that causes the receiving portion of the mobile station apparatus to operate during a pre-defined intermittent reception period of the mobile station apparatus, for example, during a receiving period of paging information addressed to the own station defined on the downlink common control channel and/or the downlink shared control channel, and/or a cell search period, (1) and that also causes the operation of the receiving portion of the mobile station apparatus to stop during periods other than the pre-defined intermittent reception period of the mobile station apparatus.

(2) Otherwise, when the transmission/reception data judging means of the mobile station apparatus judges that data addressed to the own station is present, the transmission/reception control means also causes the receiving portion of the mobile station apparatus to operate during periods other than the pre-defined intermittent reception period of the mobile station apparatus, receives the data addressed to the own station, and restarts the uplink transmission of the downlink signal quality information CQI.

The base station apparatus further has the following configuration.

The downlink signal quality information CQI judging means judges whether the downlink signal quality information CQI transmitted from the mobile station apparatus is present.

When the downlink signal quality information CQI judging means judges that the downlink signal quality information CQI is not present and data addressed to the mobile station apparatus is present in an RLC (Radio Link Control) packet data buffer, the downlink signal control means transmits the downlink signal to the mobile station apparatus during the pre-defined intermittent reception period of the mobile station apparatus, for example, during a receiving period of the paging information of the mobile station apparatus defined on the downlink common control channel and/or the downlink shared control channel, and/or the cell search period.

The downlink signal control means judges whether the downlink signal quality information CQI transmitted from the mobile station apparatus is present and, when the downlink signal quality information CQI is not present and data addressed to the mobile station apparatus is present in an RLC (Radio Link Control) packet data buffer, the downlink signal control means transmits data control information addressed to the mobile station apparatus and/or the data addressed to the mobile station apparatus during the pre-defined intermittent reception period of the mobile station apparatus, for example, during a receiving period of the paging information of the mobile station apparatus defined on the downlink common control channel and/or the downlink shared control channel, and/or the cell search period.

Otherwise, the downlink signal control means uses a low order MCS mode defined in an AMC scheme in transmission of data addressed to the mobile station apparatus by the time when it is judged that the downlink signal quality information CQI provided as feedback from the mobile station apparatus is present, during the pre-defined intermittent reception period.

Otherwise, when the downlink signal quality information CQI judging means of the base station apparatus judges that no downlink signal quality information CQI is present and data addressed to the mobile station apparatus is present in the RLC packet data buffer, the downlink signal control means uses a low order MCS mode defined in an AMC scheme in transmission of data addressed to the mobile station apparatus by the time when it is judged that the downlink signal quality information CQI provided as feedback from the mobile station apparatus is present, during the pre-defined intermittent reception period of the mobile station apparatus defined on the downlink common control channel and/or the downlink shared control channel.

Otherwise, the downlink signal control means transmits only information on whether data addressed to the mobile station apparatus is present or does not transmit the data addressed to the mobile station apparatus, by the time when it is judged that the downlink signal quality information CQI provided as feedback from the mobile station apparatus is present, during the pre-defined intermittent reception period.

Otherwise, when the downlink signal quality information CQI judging means judges that the downlink signal quality information CQI is not present and data addressed to the own station is present in the RLC packet data buffer, the downlink signal control means transmits only information on whether data addressed to the mobile station apparatus is present, by the time when it is judged that the downlink signal quality information CQI provided as feedback from the mobile station apparatus is present, during the pre-defined intermittent reception period of the mobile station apparatus defined on the downlink common control channel and/or the downlink shared control channel, or does not transmit the data addressed to the mobile station apparatus.

Otherwise, the downlink signal control means executes transmission control of data to the mobile station apparatus using the MCS mode defined in the AMC scheme according to the downlink signal quality information CQI.

Otherwise, when the downlink signal quality information CQI judging means judges that the downlink signal quality information CQI is present and data addressed to the mobile station apparatus is present in the RLC packet data buffer, the downlink signal control means executes transmission control of data to the mobile station apparatus using the MCS mode defined in the AMC scheme according to the downlink signal quality information CQI.

The present invention can also solve the above problems using a program to realize the functions of the mobile communication system, the mobile station apparatus, or the base station apparatus configured as above on a computer, or a computer-readable recording medium having the program recorded therein.

Effect of the Invention

According to the present invention, a wireless communication system using the AMC scheme is proposed, that includes: a mobile station apparatus configured by a transmission/reception data judging means of the mobile station apparatus that judges whether transmission/reception data is present, and a transmission/reception control means of the mobile station apparatus that controls wireless transmission/reception portion of the mobile station apparatus by the transmission/reception data judging means; and a base station apparatus configured by a quality information CQI judging means that judges whether the quality information CQI transmitted by the mobile station apparatus is present, and a downlink signal control means that controls the downlink signal to the mobile station apparatus based on whether the quality information CQI is present. Therefore, no control signal transmission/reception is necessary between the base station apparatus and the mobile station apparatus for transmission/reception control of the mobile station apparatus.

BRIEF DESCRIPTION OF THE DRAWINGS

FIG. 12 is a diagram of an example of an MCS mode.

EXPLANATION OF REFERENCE NUMERALS

Figure 1:
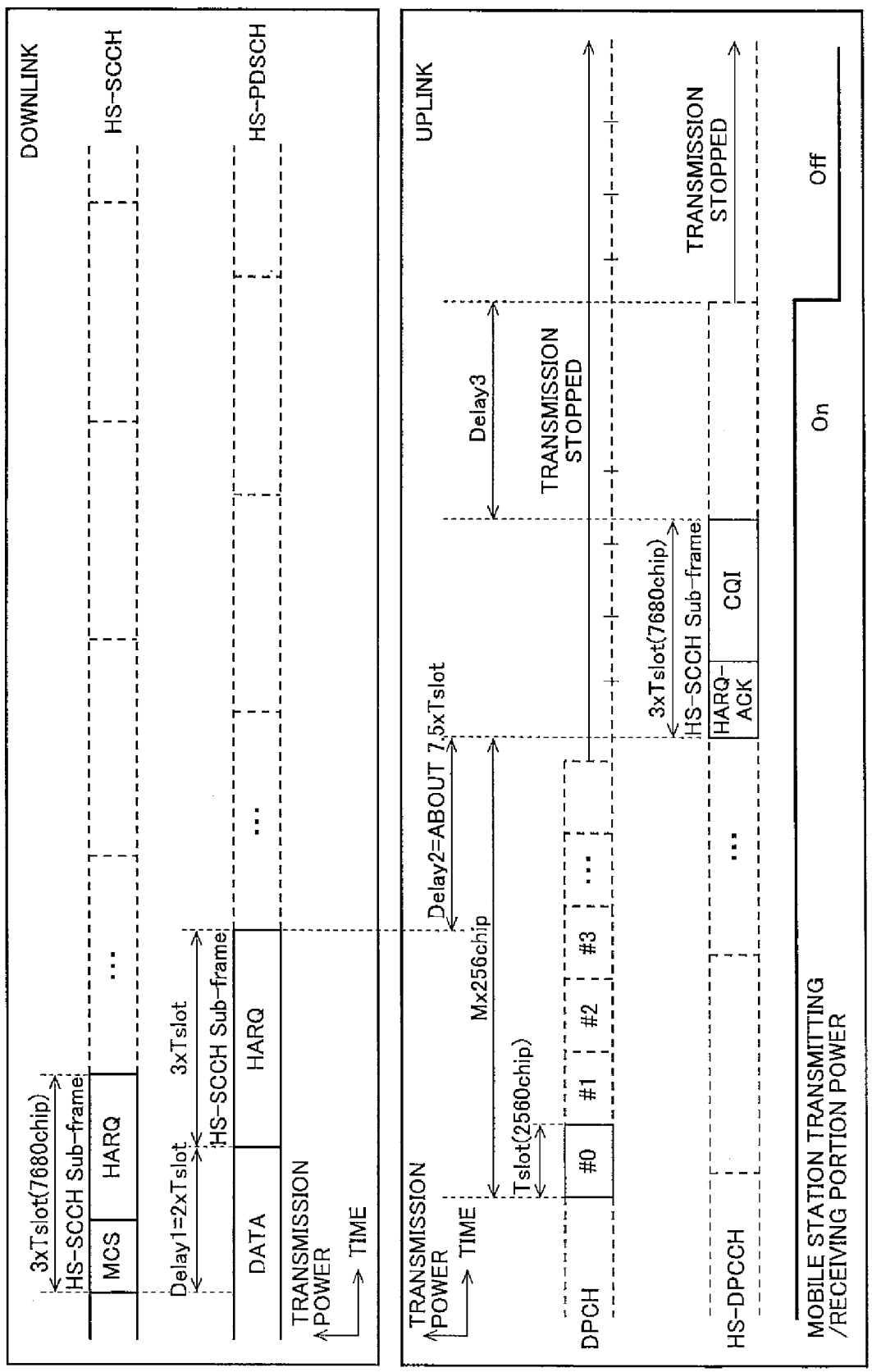
FIG. 1 is a diagram for explaining an example of a transmission/reception control means of a mobile station apparatus according to an embodiment 1 of the present invention.

100 . . . mobile station apparatus, 110 . . . antenna, 120 . . . DUP (Duplexer), 130 . . . receiving portion, 131 . . . wireless receiving portion, 132 . . . quadrature demodulating portion, 133 . . . inverse spreading portion, 134 . . . decoding portion, 135 . . . channel estimating portion, 136 . . . OFDM demodulating portion, 140 . . . transmitting portion, 141 . . . encoding portion, 142 . . . spreading portion, 143 . . . quadrature modulating portion, 144 . . . wireless transmitting portion, 145 . . . OFDM demodulating portion, 150 . . . transmission/reception control portion, 160 . . . transmission/reception data judging portion, 170 . . . transmission data buffer, 200 . . . base station apparatus, 201 . . . RLC packet data buffer, 202 . . . encoding portion, 203 . . . spreading portion, 204 . . . quadrature modulating portion, 205 . . . wireless transmitting portion, 206 . . . antenna, 207 . . . DUP, 208 . . . wireless receiving portion, 209 . . . quadrature demodulating portion, 210 . . . inverse spreading portion, 211 . . . decoding portion, 212 . . . downlink signal quality information CQI determining portion, 213 . . . downlink signal control portion, 214 . . . OFDM modulating portion, 215 . . . OFDM demodulating portion, 1 . . . base station apparatus, 2 . . . mobile station apparatus, 3 . . . downlink pilot channel, 4 . . . downlink common control channel, 5 . . . downlink shared control channel, 6 . . . downlink shared data channel, 7 . . . uplink control channel, 8 . . . uplink data channel, 9 . . . cell, 10 . . . base station control apparatus.

PREFERRED EMBODIMENTS OF THE INVENTION

Description will be given for preferred embodiments of the present invention referring to the accompanying drawings.

Embodiment 1

The basic concept of an embodiment 1 of the present invention is that: during packet communication, a mobile station apparatus judges presence or absence of data addressed to the own station; when no data addressed to the own station is present, stops providing downlink signal quality information CQI as feedback; during an intermittent reception period defined in advance of the mobile station apparatus, executes intermittent reception that causes a receiving portion to operate during, for example, a paging information (for example, a paging indicator PI of the mobile station apparatus defined on a paging indicator channel PICH) reception period and/or cell search (for example, cell search of the mobile station apparatus that a common pilot channel has defined) period in a downlink common control channel; during a receiving portion operating period, judges presence or absence of data addressed to the own station; and restarts the reception of data addressed to the own station when the data addressed to the own station is present.

The basic concept is also that: a base station apparatus judges presence or absence of the downlink signal quality information CQI feedback; when no CQI value is present and the mobile station apparatus has data to be transmitted, during an intermittent reception period defined in advance of the mobile station apparatus, transmits data control information addressed to the mobile station apparatus and/or data addressed to the mobile station apparatus; and, during an intermittent reception period defined in advance of the mobile station apparatus, does not transmit any effective packet data addressed to the mobile station apparatus or transmits, using a low order MCS mode defined in the AMC scheme, data addressed to the mobile station apparatus during a period from the time when the base station apparatus transmits the data control information addressed to the mobile station apparatus to the time when the downlink signal quality information CQI is sent back as feedback.

Figure 2:
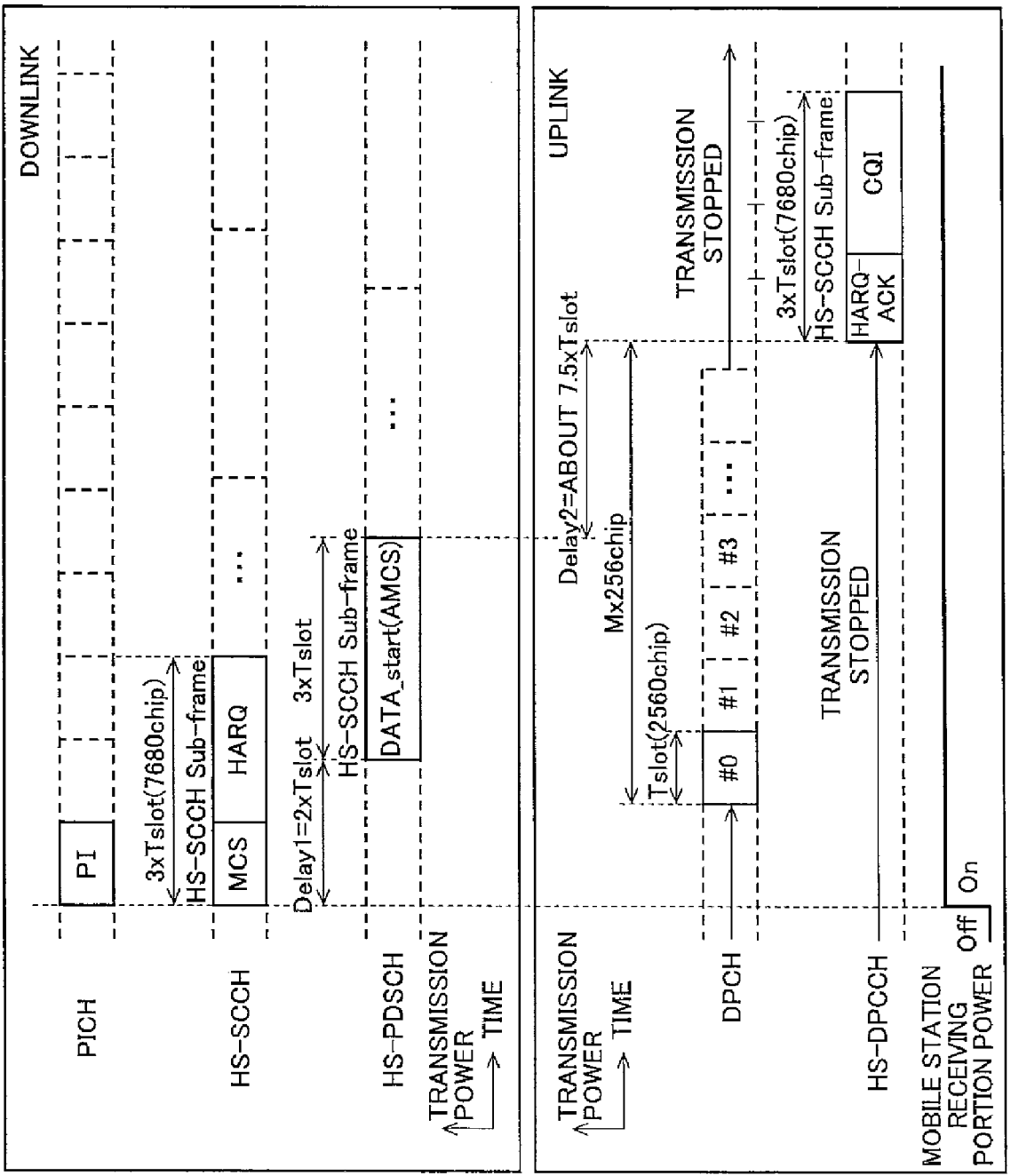
FIG. 2 is a diagram for explaining an example of a downlink signal control means of a base station apparatus according to the embodiment 1 of the present invention.

FIG. 1 is a diagram for explaining an example of a transmission/reception control means of a mobile station apparatus according to the embodiment 1 of the present invention. FIG. 2 is a diagram for explaining an example of a downlink signal control means of a base station apparatus according to the embodiment 1 of the present invention. The transmission/reception control means of the mobile station apparatus is judged by the downlink signal control means according to the present invention that the base station apparatus has.

Before describing FIGS. 1 and 2, description will be given as an example for the configurations respectively of the mobile station apparatus and the base station apparatus of the present invention, that each employs a code division multiple connection (CDMA: Code Division Multiple Access) scheme of an HSDPA.

Figure 3:
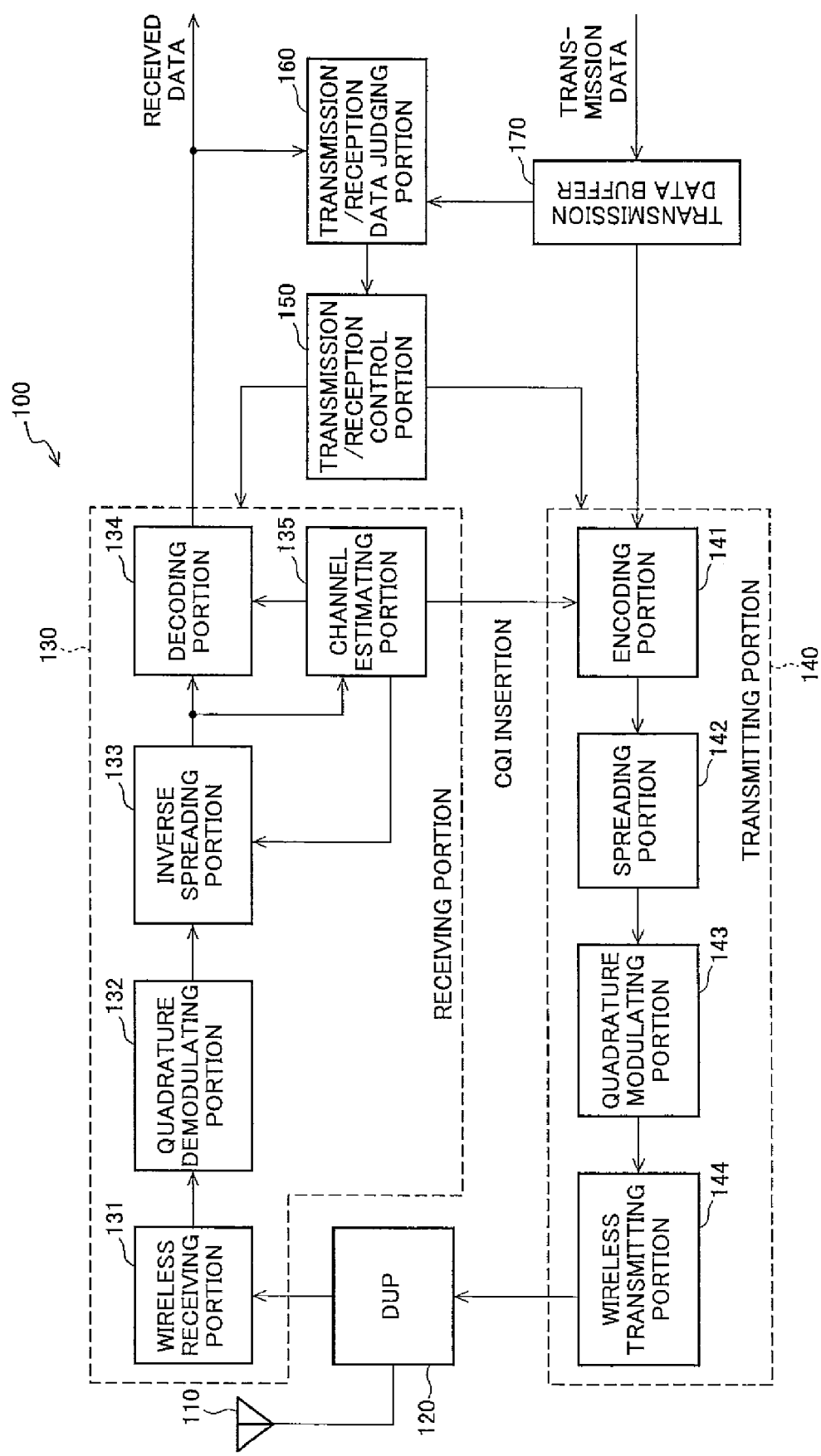
FIG. 3 is a diagram of the configuration of the mobile station apparatus according to the embodiment 1 of the present invention.
Figure 4:
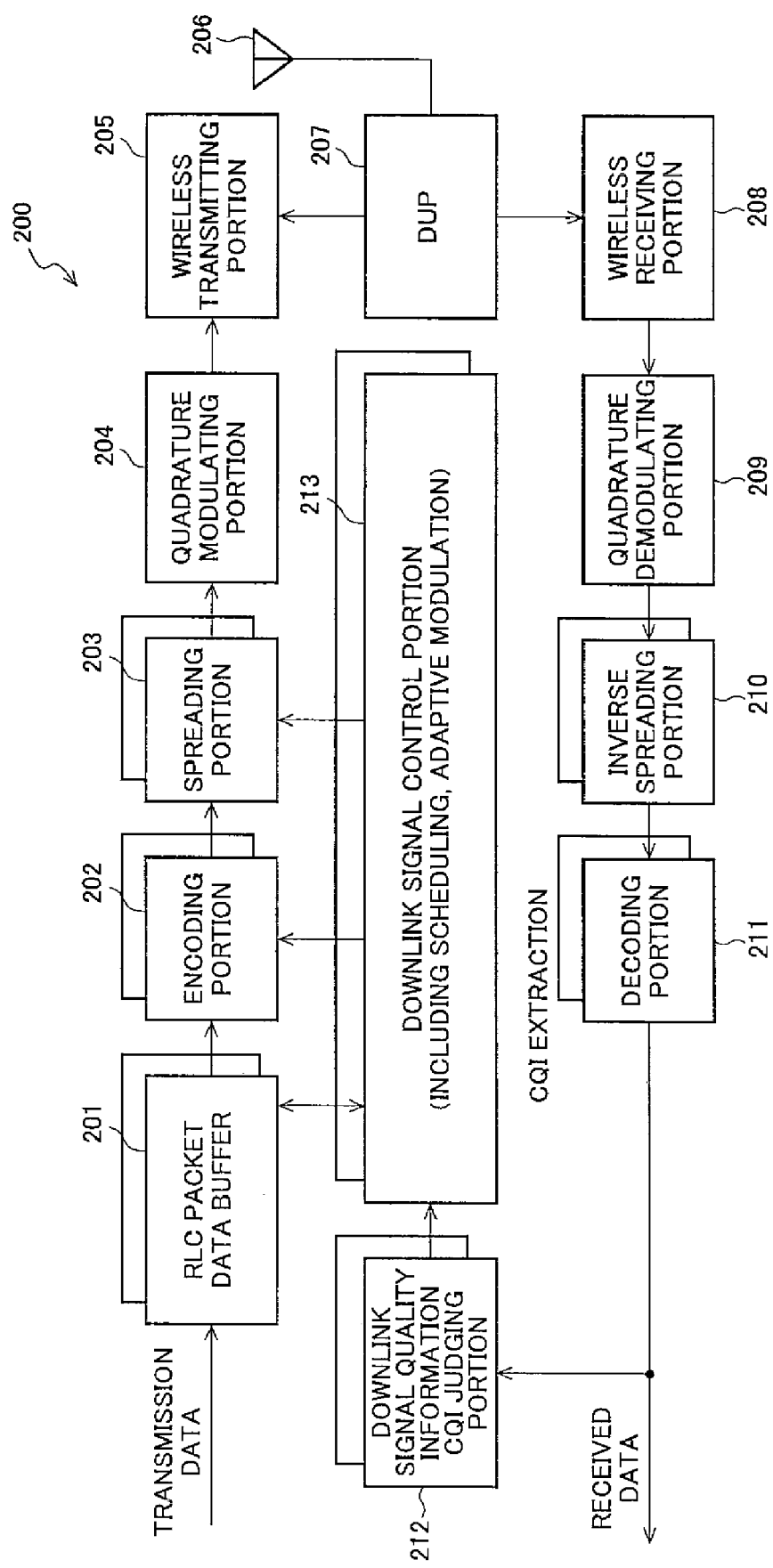
FIG. 4 is a diagram of the configuration of the base station apparatus according to the embodiment 1 of the present invention.

FIG. 3 is a diagram of the configuration of the mobile station apparatus 100 according to the embodiment 1 of the present invention. FIG. 4 is a diagram of the configuration of the base station apparatus 200 according to the embodiment 1 of the present invention.

The mobile station apparatus 100 receives a downlink signal (for example, an HS-PDSCH of a downlink shared control channel HS-SCCH and a downlink shared data channel, a CPICH of a common pilot channel, etc.) of the base station apparatus 200 from an antenna 110, separates the received downlink signal from an uplink signal using a DUP (Duplexer) 120, and outputs the separated signal to a receiving portion 130.

The receiving portion 130 is configured by components such as: a wireless receiving portion 131 that is configured by an LNA (Low Noise Amplifier), a mixer, a frequency generator, an IF amplifier, a filter, etc.; a quadrature demodulating portion 132 that is configured by a quadrature demodulator, a base band filter, an AD converter, etc.; an inverse spreading portion 133 that is configured by a local spreading code generator, a multiplier, a DLL circuit, a RAKE circuit, a signal combining circuit, etc.; a decoding portion 134 that is configured by a decoding circuit of convolution codes and turbo codes, a local clock generator, etc.; and a channel estimating portion 135 that is configured by circuits for respectively detecting the amplitude, the phase, and the electric power, etc.

The receiving portion 130 applies processes such as frequency conversion, filtering, and amplification to the received downlink signal using the wireless receiving portion 131 and outputs the processed signal to the quadrature demodulating portion 132. The quadrature demodulating portion 132 generates an IQ base band signal by IQ signal separation, filtering, and AD conversion and outputs the generated signal to the inverse spreading portion 133. The inverse spreading portion 133 applies inverse spreading signal processing to the signal by a correlation process using a local spreading code, and outputs the processed signal to the decoding portion 134. The decoding portion 134 applies a decoding processing of convolution codes and turbo codes to the signal, generates received data, and outputs the received data.

Figure 14:
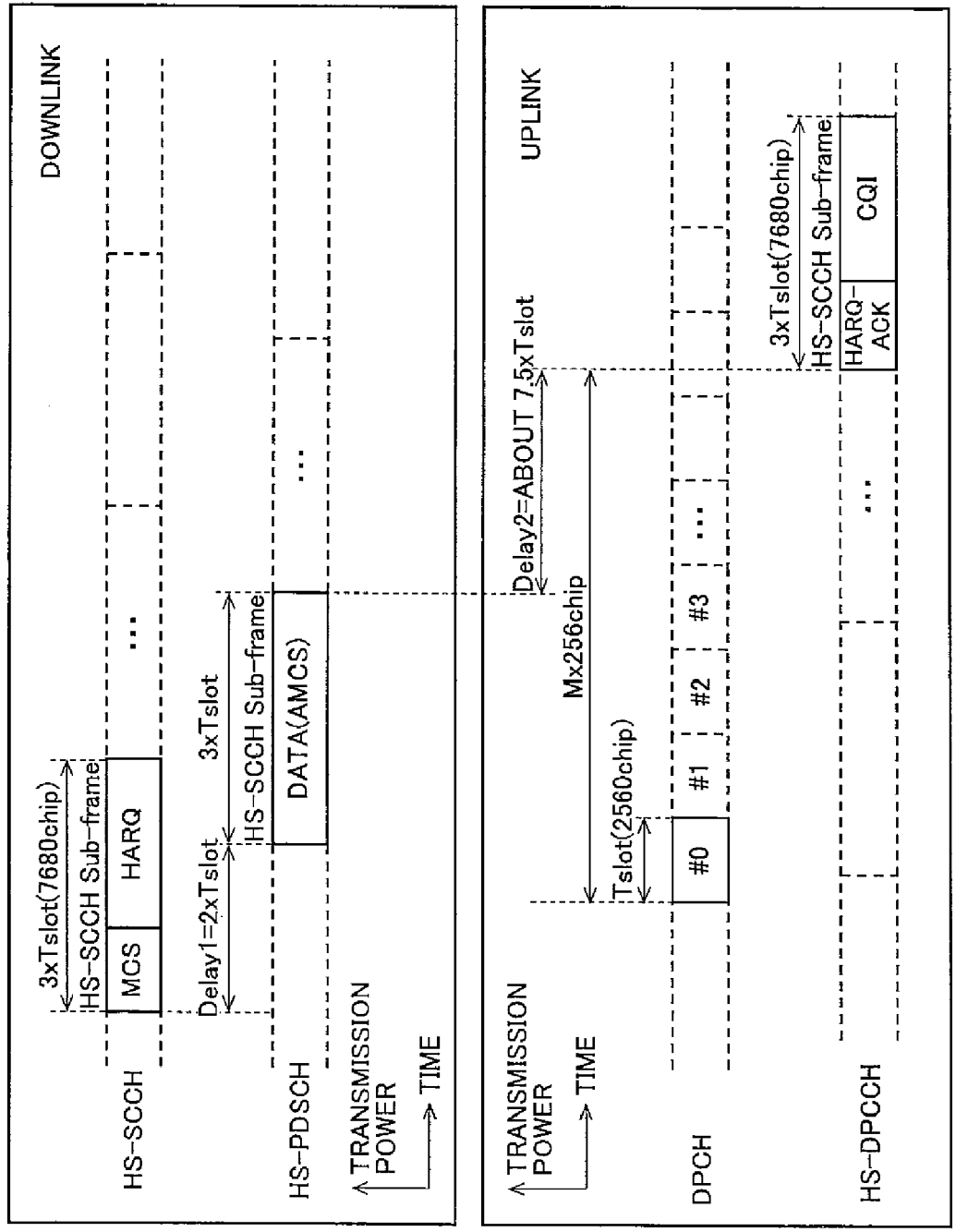
FIG. 14 is a diagram of an overview of an AMC scheme (the conventional scheme) in the HSDPA.

The channel estimating portion 135 of the receiving portion 130 estimates the wireless transmission path characteristics of the downlink using known reference signals such as a pilot signal (for example, a common pilot channel CPICH) transmitted by abase station apparatus 200, calculates downlink signal quality information CQI values such as an SNR (Signal to Noise Ratio), an SINR (Signal to Interference plus Noise Ratio), Ec/Io (energy per chip/interference wave power per unit frequency), etc., outputs the calculated CQI values to an encoding portion 141 of a transmitting portion 140. The output CQI values are inserted into an uplink control channel (for example, an HS-DSCH sub-frame of an uplink control channel HS-DPCCH of FIG. 14) and provided to the base station apparatus 200 as feedback.

The channel estimating portion 135 outputs the estimation result of the downlink wireless transmission path characteristics to the inverse spreading portion 133 and the decoding portion 134. The feedback of the CQI value is executed at time intervals defined for frames, slots, or the system (CQI feedback cycle), etc. In this case, a specific delay time (for example, a delay time Delay 2 of FIG. 14) is generated, until transmission by the antenna 110 of the mobile station apparatus 100 due to the calculation of the CQI values based on the estimation of the downlink wireless transmission path characteristics and the insertion process into the uplink control channel transmission field.

A transmission/reception data judging portion 160 of the mobile station apparatus 100 is input with the received data from the decoding portion 134 and information on a transmission data buffer 170.

The transmission/reception data judging portion 160 includes a transmission/reception data judging means that judges whether data addressed to the own station is present and whether data to be transmitted is present. More specifically, the means judges, for example, whether a data output signal addressed to the own station from the decoding portion 134 is present and whether the transmission data buffer 170 is empty, and outputs the judgment result to the transmission/reception control portion 150.

A reception data judging means can also: provide a pre-defined delay time from the time when data output addressed to the own station from the decoding portion 134 is not present, taking into account the time interval of control of the receiving portion 130 of the mobile station apparatus 100 (control frequency), the service type of packet data addressed to the own station (for example, WEB viewing that receives small-amount and discrete packet data or VoIP that receives large-amount and continuous packet data), the data transmission frequency, etc.; and, when no data addressed to the own station is present until the delay time, judge that no data addressed to the own station is present and output the judgment result to the transmission/reception control portion 150. The means can also provide threshold values such as time and the number of times using a statistical approach to data output addressed to the own station from the decoding portion 134, and judge whether any received data is present.

Similarly, a transmission data determining means can: judge that any transmission data is present when the data amount in the transmission data buffer 170 exceeds a pre-defined threshold value, taking into account the time interval of control of the transmitting portion 140 of the mobile station apparatus 100 (control frequency), the service type of packet data addressed to the own station, transmission frequency, etc.; and output the judgment result to the transmission/reception control portion 150. The means can also provide threshold values such as time, the number of times, the data amount, etc., using a statistical approach to the transmission data amount in the transmission data buffer 170 and judge whether any transmission data is present. The judgment result of the transmission/reception data judging portion 160 is output to the transmission/reception control portion 150.

The transmission/reception control portion 150 includes a transmission/reception control means. More specifically, the means controls operations respectively of the transmitting portion 140 and the receiving portion 130 based on the judgment result of the transmission/reception data judging portion 160. Control signal of the transmission/reception control portion 150 is output to the transmitting portion 140 and the receiving portion 130.

When the reception data judging means judges that no data addressed to the own station is present, no data addressed to the own station is transmitted on the downlink shared data channel HS-PDSCH for the base station apparatus 200 and the CQI values based on the AMC scheme are not used. Therefore, the mobile station apparatus 100 does not need to provide the CQI values as feedback therefrom.

Therefore, the transmission/reception control portion 150 outputs to the transmitting portion 140 an intermittent transmission (DTX) control signal to stop the uplink transmission of the downlink signal quality information CQI. The transmitting portion 140 sets the transmission power of the HS-DSCH sub-frame MCS field of the uplink control channel HS-DPCCH of FIG. 14 to zero. Similarly, because no packet data addressed to the mobile station apparatus 100 is transmitted to the downlink shared data channel HS-PDSCH, the transmitting portion 140 outputs an intermittent reception (DRX) control signal to stop the operation of the receiving portion 130 such that the power consumption of the mobile station apparatus 100 is reduced.

Thereafter, during a pre-defined intermittent reception period, that is, a receiving operation period (receiving-portion turned-on period), of the mobile station apparatus, the transmitting portion 140 causes the receiving portion 130 to operate and outputs a control signal to stop again the operation of the receiving portion 130 during a period other than the pre-defined intermittent reception period, that is, non-reception period (receiving-portion turned-off period) of the mobile station apparatus.

That is, the receiving portion 130 enters an intermittent receiving operation state where the receiving portion 130 operates during the pre-defined intermittent reception period of the mobile station apparatus and the operation of the receiving portion 130 stops during other periods.

When the transmission data judging means judges that no data addressed to the own station from the base station apparatus 200 is present and no transmission data is present in the transmission data buffer 170, the transmission/reception control means outputs a control signal to stop the operation of the transmitting portion 140 such that the power consumption of the mobile station apparatus 100 is reduced.

The transmitting portion 140 is configured by components such as: a wireless transmitting portion 144 that is configured by a power amplifier PA, a mixer, a frequency generator, an IF amplifier, a filter, etc.; a quadrature modulating portion 143 that is configured by a quadrature modulator, a base band filter, a DA converter, etc.; a spreading portion 142 that is configured by a local spreading code generator, a multiplier, etc.; and an encoding portion 141 that is configured by a convolution codes and turbo codes generator, a local clock generator, etc.

That the operations respectively of the transmitting portion 140 and the receiving portion 130 are stopped in this case refers to that all or part of the power supply for the transmission/reception portion is blocked or that one or more of a low power consumption mode, a sleep mode, a stand-by mode, an idle mode, an intermittent transmission/reception mode, etc., is/are set, to reduce the power consumption of the transmission/reception portion.

The base station apparatus 200 receives an uplink signal of the mobile station apparatus (for example, the uplink dedicated control channel HS-DPCCH and the PDCH of the uplink dedicated data channel of FIG. 3) from an antenna 206, separates a downlink signal from the uplink signal using the DUP (Duplexer) 207, applies processes of frequency conversion, filtering, and amplification using the wireless receiving portion 208, and outputs the result to the quadrature demodulating portion 209.

The quadrature demodulating portion 209 generates an IQ base band signal by IQ signal separation, filtering, and AD conversion and outputs the generated signal to a plurality of inverse spreading portions 210 (respectively for mobile station apparatuses/users).

The inverse spreading portion 210 applies an inverse spreading signal process to the signal by a correlation process using a local spreading code and outputs the processed signal to the decoding portion 211.

The decoding portion 211 applies a decoding process of convolution codes and turbo codes to the signal, generates received data, and outputs the received data.

A downlink signal quality information CQI determining portion 212 of the base station apparatus 200 is input with received data from the decoding portion 211. The downlink signal quality information CQI determining portion 212 of the base station apparatus 200 includes a downlink signal quality information CQI judging means. More specifically, the downlink signal quality information CQI judging means: judges whether CQI values are present that are provided as feedback from the plurality of mobile station apparatuses 100 respectively for which wireless links are established based on a sub-frame of the uplink control channel HS-DPCCH contained in the received data; when effective CQI values are present, extracts those CQI values; and outputs the CQI information to a downlink signal control portion 213.

The downlink signal control portion 213 of the base station apparatus 200 is input with the judgment result of the presence or the absence of the CQI values from the downlink signal quality information CQI judging portion 212, or effective CQI values. The downlink signal control portion 213 is input with transmission data amount information of the mobile station apparatus 100 for which wireless links are established, from an RLC (Radio Link Control) packet data buffer 201.

The downlink signal control portion 213 includes a downlink signal control means. More specifically, the downlink signal control means: executes scheduling of the transmission data to each mobile station apparatus 100 based on the transmission data amount information such as the presence or the absence of the transmission data from the RLC packet data buffer 201 or whether the transmission data amount exceeds a predetermined threshold value, and the CQI values of the plurality of mobile station apparatuses 100 from the downlink signal quality information CQI determining portion 212; selects the MCS mode; and outputs scheduling information of the transmission data to the RLC packet data buffer 201, a control signal of encoding rate information to the encoding portion 202, and modulation order information of the base band signal to the spreading portion 203.

When no transmission data to the mobile station apparatus 100 is present in the RLC packet data buffer 201 as the downlink signal control means, the downlink signal control means outputs scheduling information of data of another mobile station apparatus 100 to the RLC packet data buffer 201, and the MCS mode selection signal to the encoding portion 202 and the spreading portion 203.

When the transmission data to the mobile station apparatus 100 is present in the RLC packet data buffer 201, re-starting of the transmission data is requested, and no CQI value from the mobile station apparatus 100 is present; the downlink signal control means outputs a control signal to transmit ID information of the mobile station apparatus and MCS mode information to the MCS field of the sub-frame control information of the downlink shared control channel HS-SCCH during a pre-defined intermittent reception period of the mobile station apparatus.

Because no CQI value is present when the transmission data is re-started as the MCS mode information, the downlink signal control means outputs a control signal to use the low order MCS mode defined in the AMC scheme, by the time when it is judged that a CQI provided from the mobile station apparatus 100 as feedback is present. For example, the mode is set to be Mode 5 shown in FIG. 12.

Otherwise, the downlink signal control means transmits the mobile station apparatus ID information to the MCS field of the sub-frame control information of the downlink shared control channel HS-SCCH, that is, transmits, for example, "the CQI value=0 (out of range)" that the MCS mode has defined in the HSDPA specification or a reserved CQI value and does not transmit the data. The transmission of the MCS mode information is restarted at the time when a feedback CQI value from the mobile station apparatus 100 is present.

Referring to FIG. 1, description will be given for the transmission/reception control means of the mobile station apparatus 100. FIG. 1 shows the state of the final data of the packet data transmission from the base station apparatus to the mobile station apparatus.

When the transmission/reception control means judges that no data addressed to the own station is present, after a delay time (Delay 3) provided in advance, the mobile station apparatus 100 stops the uplink transmission of the downlink signal quality information CQI and switches the transmission/reception portion power of the mobile station from ON to OFF. Thereafter, the mobile station apparatus, during the packet communication thereof (in an active mode), enters an intermittent reception mode that causes the receiving portion 130 to operate during a pre-defined intermittent reception period of the mobile station apparatus and causes the operation of the receiving portion 130 to stop again during periods other than the pre-defined intermittent reception period of the mobile station apparatus.

Referring to FIG. 2, description will be given for the downlink signal control means of the base station apparatus 200. FIG. 2 shows the state of the initial data of restart of the packet data transmission from the base station apparatus to the mobile station apparatus.

When the downlink signal control means judges that no downlink signal quality information CQI is present and data addressed to the mobile station apparatus 100 is present in the RLC packet data buffer, the base station apparatus 200 transmits data control information and/or data contained in the MCS field addressed to the mobile station apparatus 100 during the pre-defined intermittent reception period of the mobile station apparatus 100. When the transmission data is restarted, the low order MCS mode defined in the AMC scheme is used. Otherwise, only the mobile station apparatus ID information is transmitted to the MCS field of the sub-frame control information of the downlink shared control channel HS-SCCH and the transmission of the MCS mode information is restarted at the time when it is judged that feedback CQI value from the mobile station apparatus 100 is present.

Figure 5:
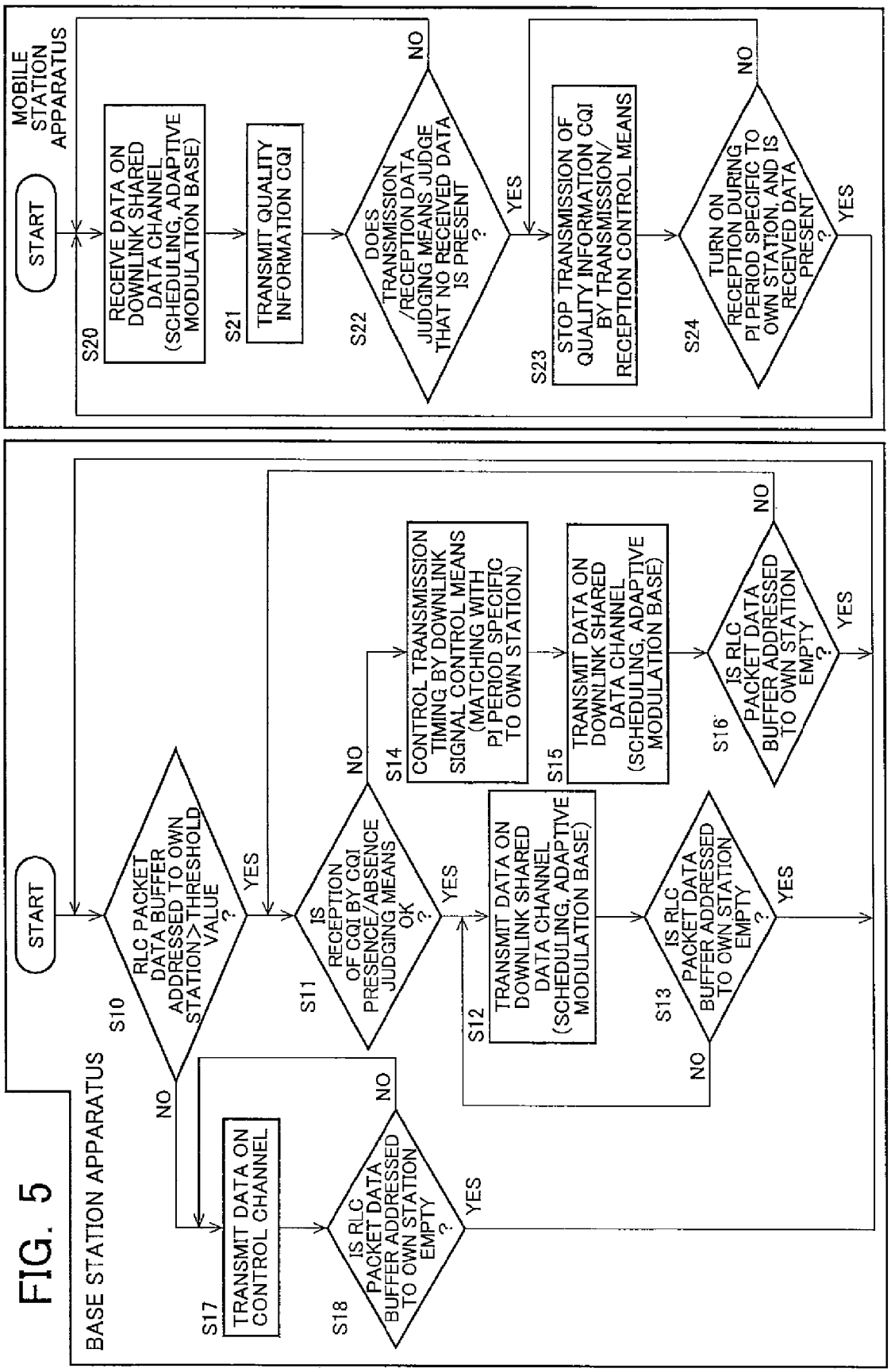
FIG. 5 is a processing flowchart of the mobile station apparatus and the base station apparatus according to the embodiment 1 of the present invention.

FIG. 5 is a flowchart of processes of the base station apparatus 200 and the mobile station apparatus 100 according to the embodiment 1 of the present invention.

In the case where a wireless link is established between the base station apparatus 200 and the mobile station apparatus 100, when the amount of the transmission data of the RLC packet data buffer addressed to the own station of the mobile station apparatus 100 exceeds a threshold value provided in advance (step S10/YES), a CQI presence/absence judging means of the base station apparatus 200 checks permission/rejection of receiving the CQI (step S11).

When a normal CQI value is received (step S11/YES), scheduling of the transmission data is executed through the downlink shared data channel and the data is transmitted in the AMC scheme until the RLC packet data buffer addressed to the mobile station apparatus 100 becomes empty (steps S12, S13).

On the other hand, no CQI value is present (step S11/NO): the sub-frame transmission timing of the downlink shared control channel HS-SCCH is adjusted matching with the pre-defined intermittent reception period of the mobile station apparatus 100 by the downlink signal control means (step S14); scheduling of the transmission data is executed through the downlink shared data channel; the data is transmitted in the AMC scheme (step S15); and, when the RLC packet data buffer addressed to the mobile station apparatus 100 is not empty (step S16/NO), the operation returns to step S11.

However, because no feedback CQI value from the mobile station apparatus 100 is present due to the processing delay of the mobile station apparatus 100 and the delay of the uplink wireless transmission path when the transmission is restarted, the low order MCS mode defined in the AMC scheme is used. Otherwise, only the mobile station apparatus ID information is transmitted to the MCS field of the sub-frame control information of the downlink shared control channel HS-SCCH and the transmission of the MCS mode information is restarted at the time when it is judged that the feedback CQI value from the mobile station apparatus 100 is present.

On the other hand, in the case where a wireless link is established between the base station apparatus 200 and the mobile station apparatus 100, when the amount of the transmission data of the RLC packet data buffer addressed to the mobile station apparatus 100 is smaller than the threshold value provided in advance (step S10/NO), because the data amount is small, the base station apparatus 200 repeats the operation until the RLC packet data buffer addressed to the mobile station apparatus 100 becomes empty, not using the downlink shared data channel HS-PDSCH but using the control channel such as the downlink shared control channel HS-SCCH, etc., (steps S17, S18).

When a wireless link is established between the base station apparatus 200 and the mobile station apparatus 100, the mobile station apparatus 100 receives data addressed to the mobile station apparatus 100 that has been scheduled by the base station apparatus 200 and transmitted in the AMC scheme in the downlink shared data channel (step S20).

The mobile station apparatus 100 executes estimation of the wireless transmission path characteristics of the downlink signal, calculates the downlink signal quality information CQI, and provides the information CQI to the base station apparatus 200 as feedback (step S21).

When the transmission/reception data judging means judges whether data addressed to the mobile station apparatus 100 is present and judges that no received data is present (step S22/YES), the transmission/reception control means stops providing the CQI value as feedback to the base station apparatus 200 (step S23). Thereafter, the mobile station apparatus 100 enters the intermittent reception mode.

The receiving portion is caused to operate during the pre-defined intermittent reception period of the mobile station apparatus 100 and whether data addressed to the mobile station apparatus 100 is present is judged. When data addressed to the mobile station apparatus 100 is present (step S24/YES), the process returns to step S20 and the receiving portion is caused to continuously operate and the receiving portion receives the data addressed to the mobile station apparatus 100.

When no data addressed to the mobile station apparatus 100 is present (step S24/NO), the process returns to step S23 and the receiving portion continues the intermittent reception mode.

Figure 6:
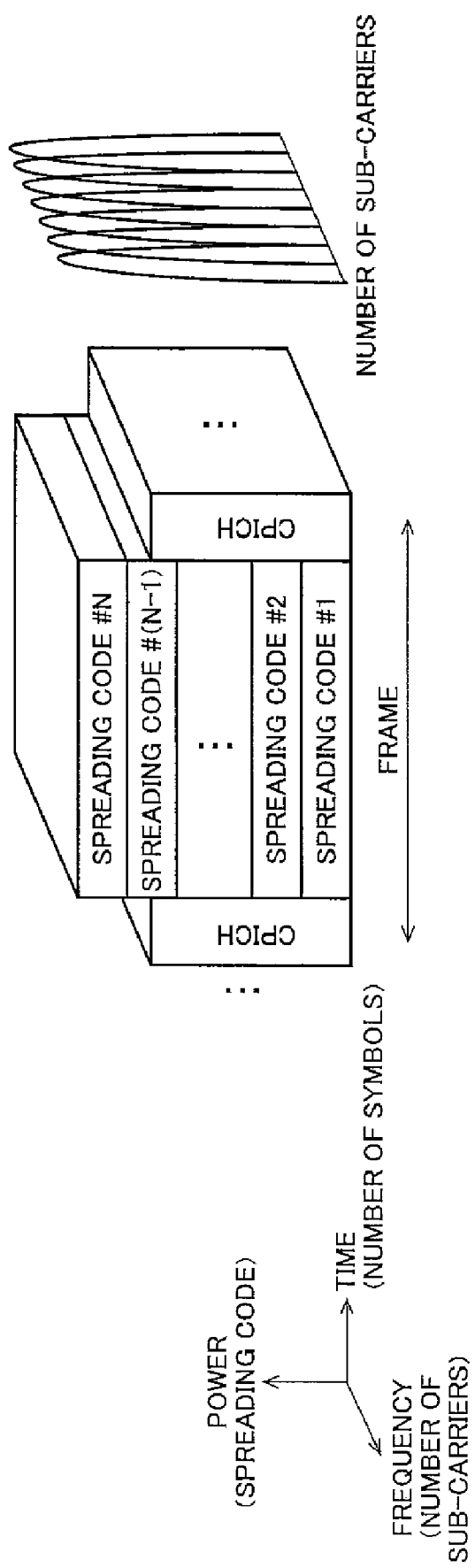
FIG. 6 is a diagram of an example of the configuration of a downlink signal of an OFCDM scheme.

Though no frequency is presented in the above drawings, the present invention is applicable even when sub-carriers such as an OFDM shown in FIG. 6 are used on the frequency axis.

FIG. 6 shows the configuration of the downlink signal in an orthogonal frequency/code division multiplexing (OFCDM: Orthogonal Frequency and Code Division Multiplexing, or Spread-OFDM) scheme. An exemplary configuration can be, for example, a configuration having: a channel that has a spread code #N having a code number N and that may include a downlink common control channel and a downlink shared control channel; and a multiplexed channel that has spread codes #1 to #(N-1) that may includes a downlink shared data channel.

Though a case where an SINR is used as a CQI value has been shown, the present invention is also applicable to the cases where, of the mobile station apparatus: a reception power of each sub-carrier, an SINR of each sub-carrier, an SNR or an SIR of each sub-carrier, an SINR of each sub-carrier block configured by a plurality of sub-carriers, an SNR or an SIR of each sub-carrier block configured by a plurality of sub-carriers, an SINR of each sub-carrier block group configured by a plurality of sub-carrier blocks, an SNR or an SIR of each sub-carrier block group configured by a plurality of sub-carrier blocks, etc., are respectively used as the reception quality. The CQI value is not limited to the method of obtaining from an estimated value of the wireless transmission path characteristics of the downlink signal and another method may be used.

Figure 9:
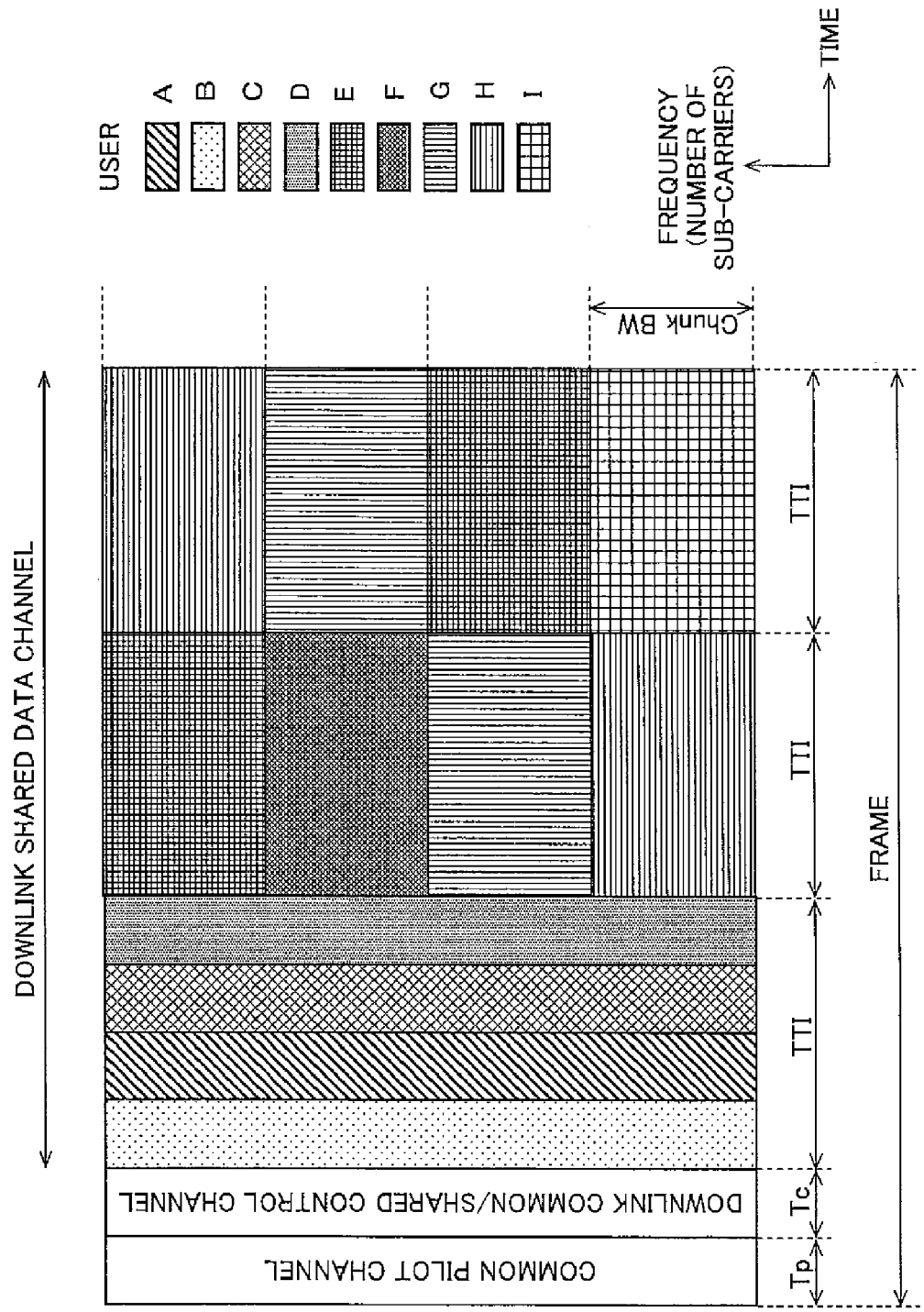
FIG. 9 is a diagram of an example of the configuration of a downlink signal of an OFDMA scheme.

Though the case where a sub-frame is used as a unit of user data, the present invention is also applicable to the cases where a method is used of setting each sub-carrier or some sub-carriers as one block in a slot that is shorter than a frame shown in FIG. 9 (TTI: Transmission Time Interval) or a preset time interval, a variable time interval, or a frequency axis and adaptively assigning this block to a user based on a CQI, etc.

Embodiment 2

The basic concept of an embodiment 2 of the present invention is that a mobile station apparatus, during packet communication thereof: judges whether data addressed to the mobile station apparatus is present; when no data addressed to the mobile station apparatus is present, stops providing the downlink signal quality information CQI as feedback; during a pre-defined intermittent reception period of the mobile station apparatus, executes intermittent reception to cause the receiving portion to operate during, for example, the reception period of paging information in the downlink common control channel and/or the downlink shared control channel (for example, a paging indicator PI of the mobile station apparatus defined in the paging indicator channel PICH) and/or the reception period of the data control information addressed to the mobile station apparatus (for example, data scheduling information including the mobile station apparatus ID information), and/or a cell search (for example, a cell search of the mobile station apparatus that the common pilot channel has defined) period; during the operating period of the receiving portion, judges whether data addressed to the mobile station apparatus is present; and restarts the reception of data addressed to the mobile station apparatus when the data addressed to the mobile station apparatus is present.

The basic concept is also that a base station apparatus: judges whether any downlink signal quality information CQI feedback is present; when no CQI value is present and transmission data is present in the mobile station apparatus and/or during a pre-defined intermittent reception period of the mobile station apparatus, for example, during the reception period of paging information in the downlink common control channel and/or the downlink shared control channel (for example, a paging indicator PI of the mobile station apparatus defined in the paging indicator channel PICH) and/or the reception period of the data control information addressed to the mobile station apparatus (for example, data scheduling information including the mobile station apparatus ID information), and/or a cell search (for example, a cell search of the mobile station apparatus that the common pilot channel has defined) period, transmits data control information addressed to the mobile station apparatus and/or the data addressed to the mobile station apparatus; and, during the pre-defined intermittent reception period of the mobile station apparatus, does not transmit any effective packet data addressed to the mobile station apparatus or transmits the data addressed to the mobile station apparatus using the low order MCS mode defined in the AMC scheme during a time period from the time when the data control information addressed to the mobile station apparatus is transmitted by the time when the downlink signal quality information CQI is provided as feedback.

Description will be given for the configuration of the mobile station apparatus and the base station apparatus according to the embodiment 2 of the present invention, referring to an orthogonal frequency division multiple access (OFDMA: Orthogonal Frequency Division Multiple Access) scheme as an example.

Figure 7:
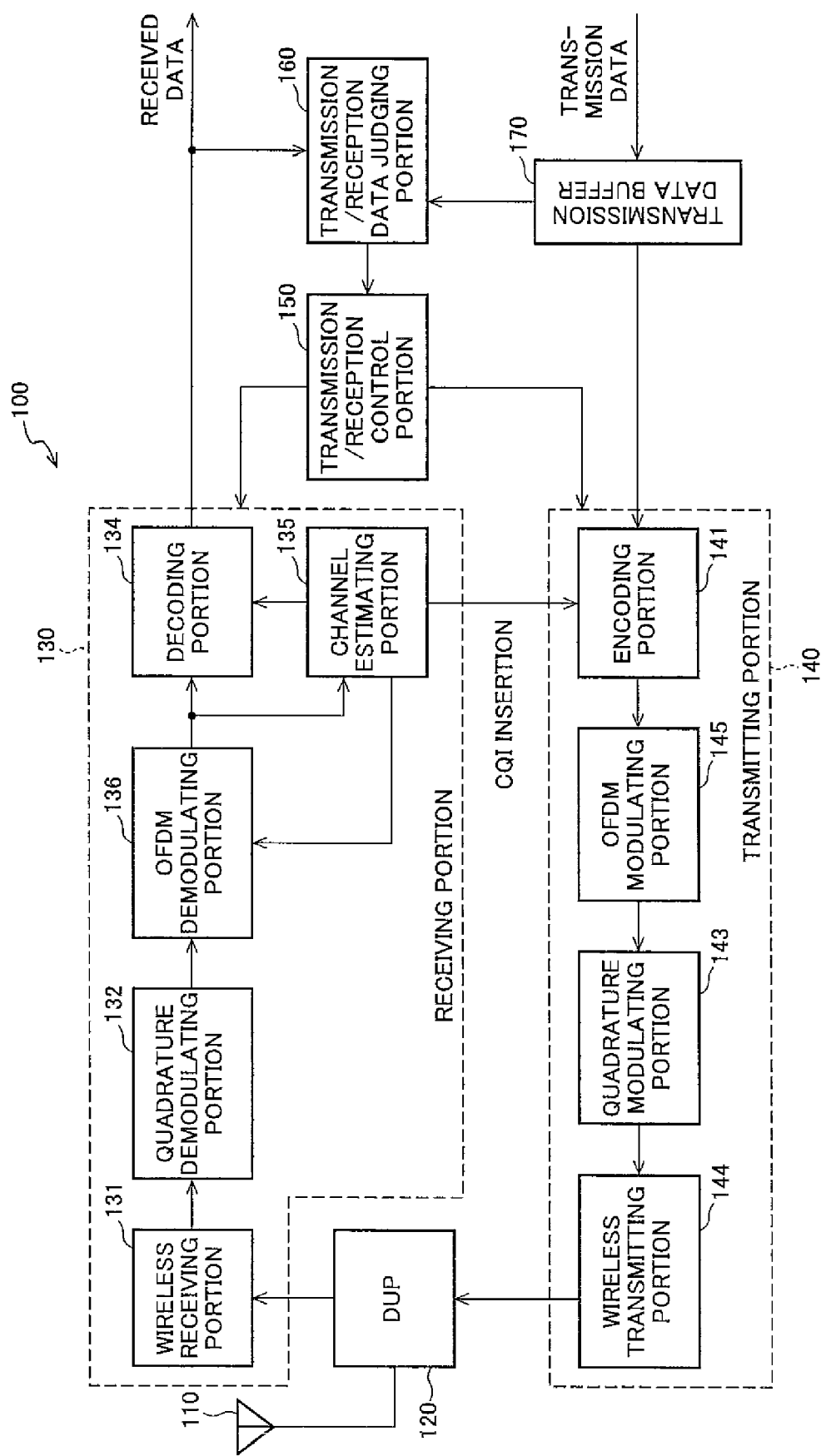
FIG. 7 is a diagram of the configuration of a mobile station apparatus according to an embodiment 2 of the present invention.

FIG. 7 is a diagram of the configuration of the mobile station apparatus according to the embodiment 2 of the present invention. In FIG. 7, the same components as those in FIG. 3 are given the same reference numerals and the detailed description thereof is omitted. The difference of FIG. 3 is that the inverse spreading portion 133 is replaced by an OFDM demodulating portion 136 and the spreading portion 142 is replaced by an OFDM modulating portion 145.

Figure 8:
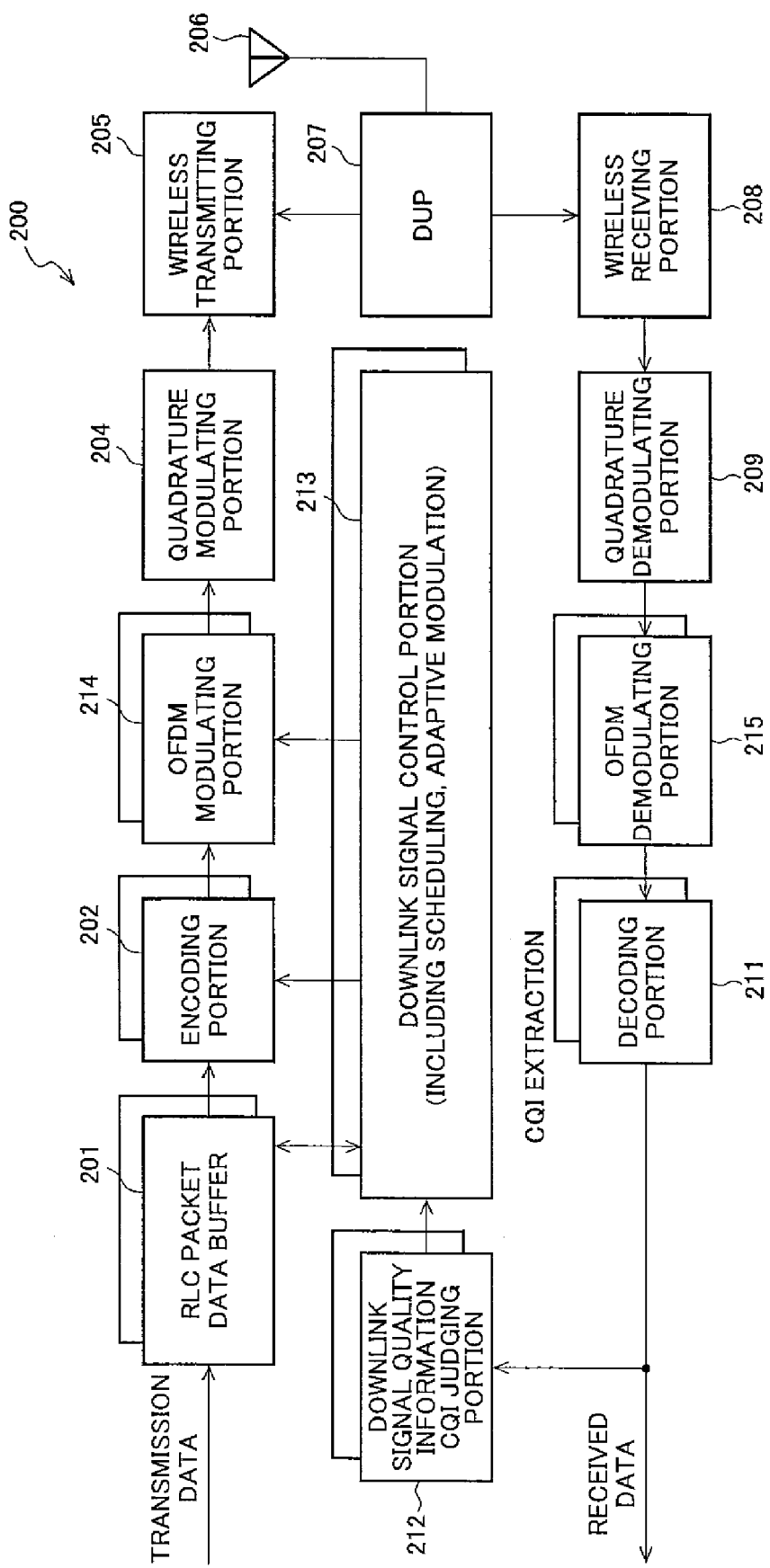
FIG. 8 is a diagram of the configuration of a base station apparatus according to the embodiment 2 of the present invention.

FIG. 8 is a diagram of the configuration of the base station apparatus according to the embodiment 2 of the present invention. In FIG. 8, the same components as those in FIG. 4 are given the same reference numerals and the detailed description thereof is omitted. The difference of FIG. 4 is that the inverse spreading portion 210 is replaced by an OFDM demodulating portion 215 and the spreading portion 203 is replaced by an OFDM modulating portion 214.

The mobile station apparatus 100 receives a downlink signal of the base station apparatus 200 from the antenna 110 and inputs the received signal into the OFDM demodulating portion 136 through the DUP 120, the wireless receiving portion 131, and the quadrature demodulating portion 132. The OFDM demodulating portion 136 applies a frame synchronizing process, FFT (Fast Fourier Transform) transformation, and a parallel/serial conversion to an OFDM signal and outputs the processed signal to the decoding portion 134. The OFDM demodulating portion 136 utilizes the estimation result of the wireless transmission path characteristics of the downlink signal for the demodulating process.

The base station apparatus 200 receives an uplink signal of the mobile station apparatus 100 from the antenna 206 and inputs the received signal to the OFDM demodulating portion 215 through the DUP 207, the wireless receiving portion 208, and the quadrature demodulating portion 209. The OFDM demodulating portion 215 outputs to the decoding portion 211 by a frame synchronizing process, FFT transformation, and a parallel/serial conversion of the OFDM signal.

FIG. 9 is an example of a diagram of the configuration of the downlink applied with an orthogonal frequency division multiple access (OFDMA) scheme. As shown in FIG. 9, the wireless resources of frequencies and time are distributed to the common pilot channel CPICH, the downlink common control channel, the downlink shared control channel, and the downlink shared data channel. The common pilot channel and the downlink common/shared control channel are assigned to time slots over the entire frequency band. The downlink shared data channel is assigned with packet data of each user. The downlink common/shared control channel contains paging indicator PI information addressed to the own station that the paging indicator channel PICH has defined and paging control information corresponding to the paging information that the paging channel PCH has defined and/or data control information addressed to the own station.

For example, users A, B, C, and D are assigned to a time division multiplex (TDM) channel with which a frequency diversity effect over the entire frequency band can be obtained, and users E, F, G, H and I are assigned to a time/frequency division multiplex (TDM/FDM: Time Division Multiplex/Frequency Division Multiplex) channel with which a multi-user diversity effect can be obtained by a time slot (TTI: Transmission Time Interval) and a frequency block (Chunk BW).

Figure 10:
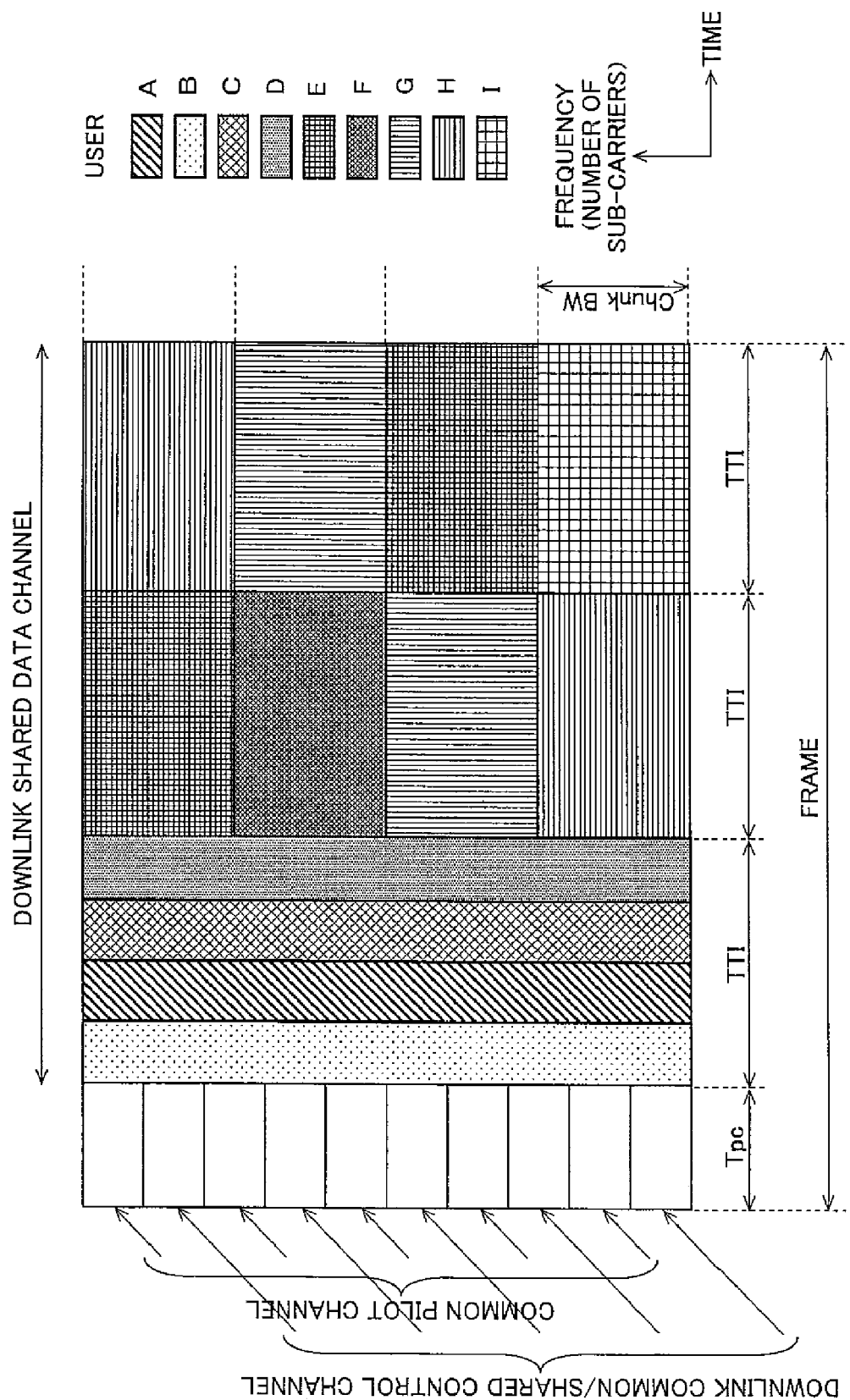
FIG. 10 is a diagram of an example of the configuration of a downlink signal of the OFDMA scheme.
Figure 11:
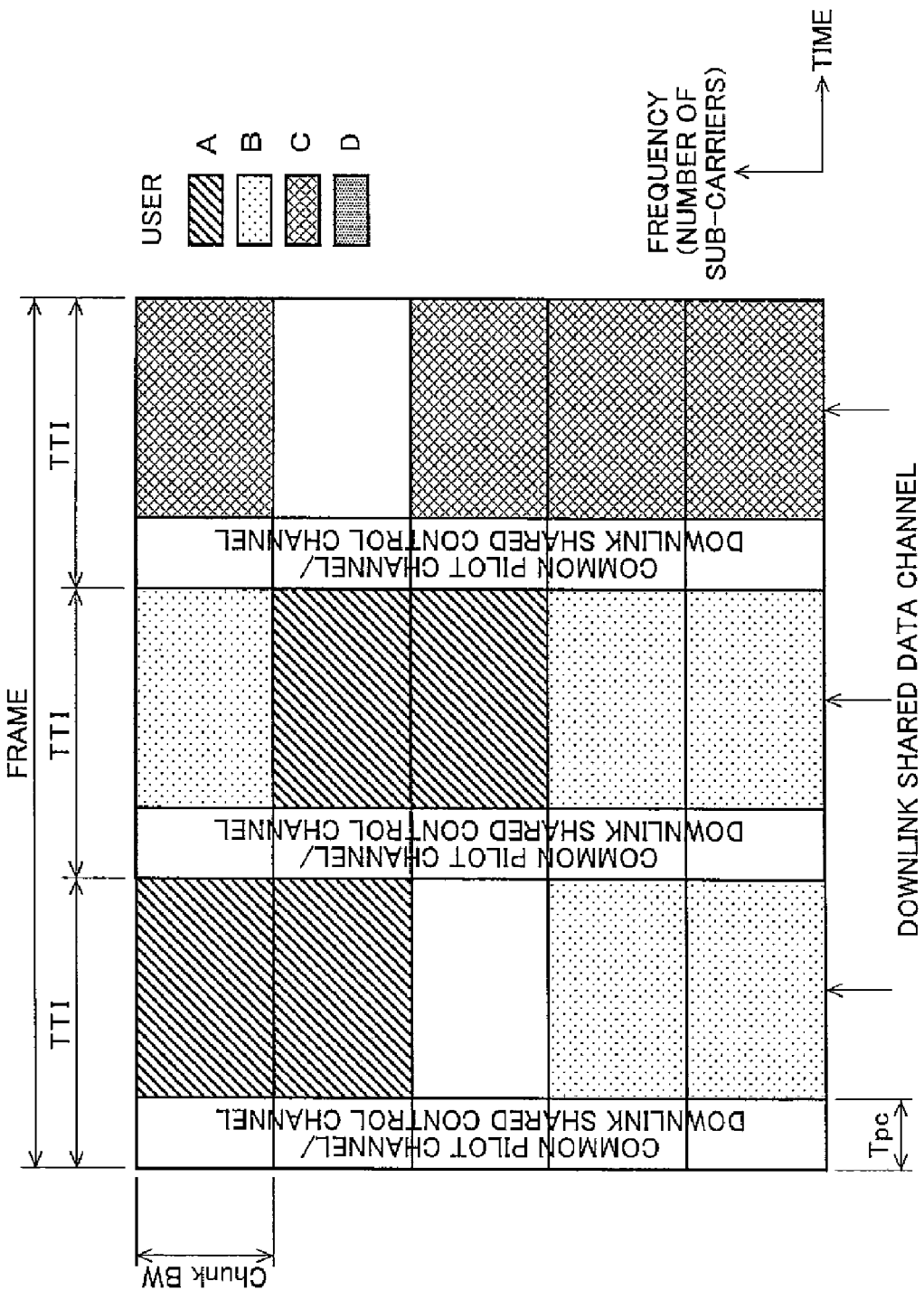
FIG. 11 is a diagram of an example of the configuration of a downlink signal of the OFDMA scheme.
Figure 13:
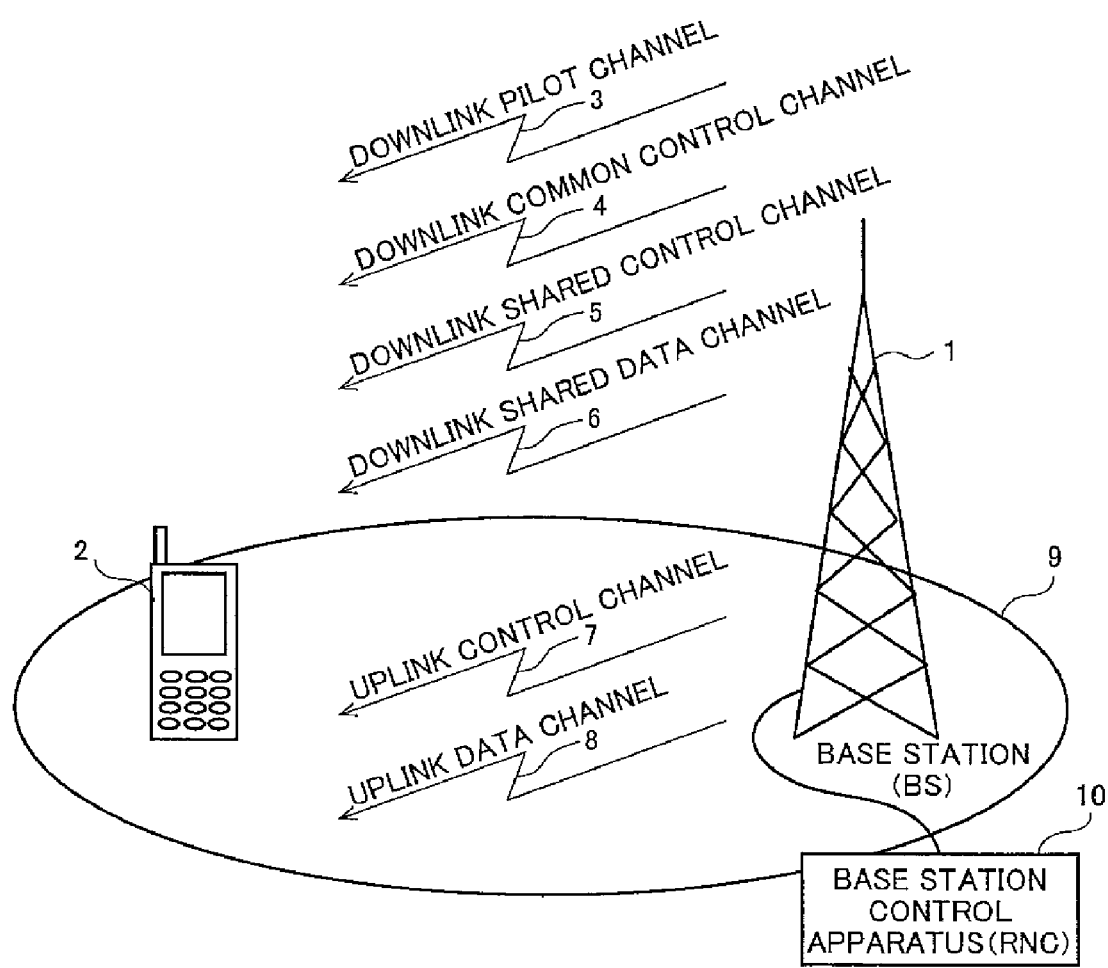
FIG. 13 is a diagram for explaining communication in an HSDPA.

FIG. 9 shows that the common pilot channel and the downlink common/shared control channel are assigned in time slots over the entire frequency band at the head of a frame. However, as shown in FIG. 10, the common pilot channel and the downlink common/shared control channel can also be alternately disposed by the frequency division multiplex (FDM). As shown in FIG. 11, the common pilot channel/shared control channel can also be disposed at the head of each time slot (TTI). In the case of FIG. 11, the common control channel is disposed at the center of the entire band of the downlink channel.

The transmission/reception control means of the mobile station apparatus 100 according to the embodiment 2 of the present invention is same as that of FIG. 1. When it is judged that no data addressed to the own station (for example, the user A of FIG. 9) is present, the transmission/reception control means stops uplink transmission of the downlink signal quality information CQI after the delay time (Delay 3) provided in advance. The stoppage of the uplink transmission of the downlink signal quality information CQI can null the transmission power of the MCS field assigned to the own station or can release the wireless resources of the MCS field assigned to the own station.

When a transmission packet is present in the transmission data buffer, the mobile station apparatus restarts transmission of the downlink signal quality information CQI to the MCS field assigned to the own station. When the wireless resources of the MCS field assigned to the own station are released, the mobile station apparatus can request assignment of wireless resources to the base station using the uplink random access channel RACH (Random Access Channel) or the uplink shared control channel SCSCH (Shared Control Signaling Channel).

In the case of FIG. 9, the mobile station apparatus enters the intermittent reception mode that causes the receiving portion to operate during a reception period Tc of paging information addressed to the own station and/or data control information addressed to the own station defined in the paging control information contained in the downlink common/shared control channel and an own station cell search period Tp that the common pilot channel has defined, that is, during the pre-defined intermittent reception period of the own station, and causes the receiving portion to stop the operation thereof again during periods other than the pre-defined intermittent reception period of the own station.

In the case of FIG. 10, the mobile station apparatus enters the intermittent reception mode that causes the receiving portion to operate during a reception period Tpc of paging information addressed to the own station and/or data control information addressed to the own station defined in the paging control information contained in the downlink common/shared control channel and the own station cell search period Tpc that the common pilot channel has defined, that is, during the pre-defined intermittent reception period of the own station, and causes the receiving portion to stop the operation thereof again during periods other than the pre-defined intermittent reception period of the own station.

In the case of FIG. 11, the mobile station apparatus enters the intermittent reception mode that causes the receiving portion to operate during a reception period Tpc of paging information addressed to the own station and/or data control information addressed to the own station defined in the paging control information contained in the downlink shared control channel and the own station cell search period (one TTI period at the head of a frame) that the common pilot channel and the downlink common control channel have defined, that is, during the pre-defined intermittent reception period of the own station, and causes the receiving portion to stop the operation thereof again during periods other than the pre-defined intermittent reception period of the own station.

In the case of FIG. 11, the paging information addressed to the own station and/or data control information addressed to the own station defined in the paging control information contained in the downlink shared control channel at the head of each TTI can be assigned to the plurality of users that are grouped. Therefore, each mobile station apparatus can be assigned to a different downlink shared control channel (a different reception period). That is, the different mobile station apparatus enters the intermittent reception mode that causes the receiving portion to operate during a pre-defined different intermittent reception period and causes the operation of the receiving portion to stop again during periods other than the pre-defined intermittent reception period of the mobile station apparatus. For example, the user A may set one TTI period from the head of a frame including the Tpc period at the head of the frame to be the intermittent reception period and the user B may set a Tpc period included in one TTI period and a third TTI from the head of a frame to be the intermittent reception period.

A downlink signal control means of the base station apparatus 200 according to the embodiment 2 of the present invention is same as that of FIG. 2. When the downlink signal control means judges that no downlink signal quality information CQI is present (this can be judged using the reception power of the MCS field, or presence or absence of assignment of wireless resources) and data addressed to the mobile station apparatus 100 is present in the RLC packet data buffer, the base station apparatus 200 transmits data of the data control information addressed to the mobile station apparatus 100 during a pre-defined intermittent reception period of the mobile station apparatus that corresponds to the above FIGS. 9, 10, and 11. When the transmission data is restarted, the low order MCS mode defined in the AMC scheme is used. Otherwise, only the mobile station apparatus ID information is transmitted to the MCS field of the sub-frame control information of the downlink shared control channel HS-SCCH and the transmission of the MCS mode information is restarted at the time when it is judged that any feedback CQI value from the mobile station apparatus 100 is present.

The base station apparatus judges whether the packet communication of the mobile station apparatus has been restarted, based on presence or absence of reception power of the MCS field. When the wireless resources of the MCS field are released, it is judged whether the packet communication of the mobile station apparatus has been restarted, based on presence or absence of a wireless resource assignment request on the uplink random access channel RACH (Random Access Channel) and/or the uplink shared control channel SCSCH (Shared Control Signaling Channel).

A process flowchart of the base station apparatus 200 and the mobile station apparatus 100 is same as that of FIG. 5 and, therefore, is omitted. As to the CQI value, similarly to the embodiment 1, the present invention is applicable even when another method is used.

In FIG. 9, the time division multiplexing (the users A, B, C, and D) with which the frequency diversity effect over the entire frequency band can be obtained, or the time/frequency division multiplexing (users E, F, G, H, and I) with which the multi-user diversity effect can be obtained are shown. However, the present invention is also applicable to the case where a method of grouping each sub-carrier or some sub-carriers into one variable block, or grouping some blocks into one block group and adaptively assigning the block or the block group to a user based on the CQI, etc., at a preset time interval, a variable time interval, or a frequency axis.

The present invention can be realized as a computer program that realizes functions of the mobile communication system, the mobile station apparatus, and the base station apparatus of the present invention. This program is stored in a computer-readable recording medium and the processes are realized by the above program.

The main memory itself may be a program medium as the recording medium. Otherwise, the recording medium may be a program medium that can be read by providing a program reading apparatus as an external storing apparatus and inserting a recording medium therein.

In this case, the above program medium may be any type of medium such as: tapes including a magnetic tape and a cassette tape; discs including magnetic disc such as a flexible disc, a hard disc and optical discs such as a CD-ROM/MO/MD/DVD; cards including IC cards (including a memory card), an optical card; or media that each fixedly carry a program including semiconductor memories such as a mask ROM, an FPROM, an EEPROM, a flash ROM.

Because the system is configured to be connectable to a network in the embodiment, the system may be adapted to directly receive supply of the above program stored in a storing apparatus from a server computer through the network. In this case, the storing apparatus of this server computer is included in the storing media of the present invention.

As above, reduction of costs, and portability and multi-purpose property can be improved by programming the functions of the above embodiment and distributing the programmed functions.

The invention claimed is:

1. A mobile communication system comprising a base station apparatus and a mobile station apparatus, the base station apparatus transmitting a downlink signal comprising a downlink pilot channel, a downlink common control channel, a downlink shared control channel, and a downlink shared data channel, the mobile station apparatus setting an uplink control channel with the base station apparatus, measuring reception quality of the downlink signal, and transmitting downlink signal quality information CQI corresponding to the reception quality to the base station apparatus using the uplink control channel, the base station apparatus controlling transmission of data to the mobile station apparatus using the downlink signal quality information CQI, wherein the mobile station apparatus comprises a reception data judging means that judges whether data addressed to the own station contained in the downlink signal transmitted by the base station apparatus is present, and a reception control means that enters an intermittent reception mode that stops transmission of the downlink signal quality information CQI, that causes a receiving portion to operate during a pre-defined intermittent reception period, that stops the operation of the receiving portion in periods other than the pre-defined intermittent reception period, when the reception data judging means judges that no data addressed to the own station from the base station apparatus is present, and wherein the base station apparatus comprises a downlink signal quality information CQI judging means that judges whether the downlink signal quality information CQI transmitted from the mobile station apparatus is present, and a downlink signal control means that transmits the downlink signal to the mobile station apparatus during an intermittent receivable period when the downlink signal quality information CQI judging means judges that the downlink signal quality information CQI is not present and data addressed to the mobile station apparatus is present in an RLC packet data buffer.

2. The mobile communication system as defined in claim 1, wherein the reception control means of the mobile station apparatus causes the receiving portion to operate during the pre-defined intermittent reception period and, when the reception data judging means judges that data addressed to the own station is present, causes the receiving portion to operate also in periods other than the pre-defined intermittent reception period and, thereby, receives the data addressed to the own station and restarts the uplink transmission of the downlink signal quality information CQI.

3. A non-transitory computer-readable medium having recorded thereon a program that causes a computer to function as each means of the mobile communication system as defined in claim 2, or each means of the mobile station apparatus, or each means of the base station apparatus.

4. The mobile communication system as defined in claim 1, wherein the downlink signal control means of the base station apparatus transmits data control information addressed to the mobile station apparatus and/or the data addressed to the mobile station apparatus during the pre-defined intermittent reception period.

5. A non-transitory computer-readable medium having recorded thereon a program that causes a computer to function as each means of the mobile communication system as defined in claim 4, or each means of the mobile station apparatus, or each means of the base station apparatus.

6. The mobile communication system as defined in claim 1, wherein the downlink signal control means of the base station apparatus uses a low order MCS mode defined in an AMC scheme in transmission of the data addressed to the mobile station apparatus by the time when it is judged that the downlink signal quality information CQI provided as feedback from the mobile station apparatus is present, during the pre-defined intermittent reception period.

7. The mobile communication system as defined in claim 1, wherein the downlink signal control means of the base station apparatus transmits only information on whether the data addressed to the mobile station apparatus is present by the time when it is judged that the downlink signal quality information CQI provided as feedback from the mobile station apparatus is present, during the pre-defined intermittent reception period.

8. The mobile communication system as defined in claim 1, wherein the downlink signal control means of the base station apparatus does not transmit the data addressed to the mobile station apparatus by the time when it is judged that the downlink signal quality information CQI provided as feedback from the mobile station apparatus is present, during the pre-defined intermittent reception period.

9. The mobile communication system as defined in claim 1, wherein the downlink signal control means of the base station apparatus executes transmission control of data to the mobile station apparatus using an MCS mode defined in an AMC scheme according to the downlink signal quality information CQI.

10. A non-transitory computer-readable medium having recorded thereon a program that causes a computer to function as each means of the mobile communication system as defined in claim 1, or each means of the mobile station apparatus, or each means of the base station apparatus.

11. A mobile station apparatus that sets an uplink control channel with a base station apparatus, that receives a downlink signal containing a downlink pilot channel, a downlink common control channel, a downlink shared control channel, and a downlink shared data channel, that measures reception quality of the received downlink signal, and that transmits downlink signal quality information CQI corresponding to the reception quality to the base station apparatus using the uplink control channel, comprising:

a reception data judging means that judges whether data addressed to the mobile station apparatus is present in the downlink signal transmitted by the base station apparatus; and a reception control means that enters an intermittent reception mode that stops transmission of the downlink signal quality information CQI, that causes a receiving portion to operate during a pre-defined intermittent reception period, and that stops the operation of the receiving portion in periods other than the pre-defined intermittent reception period, when the reception data judging means judges that no data addressed to the mobile station apparatus from the base station apparatus is present.

12. The mobile station apparatus as defined in claim 11, wherein the reception control means causes the receiving portion to operate during the pre-defined intermittent reception period and, when the reception data judging portion judges that the data addressed to the mobile station apparatus is present, causes the operation of the receiving portion to operate during periods other than the pre-defined intermittent reception period, receives the data addressed to the mobile station apparatus, and restarts the uplink transmission of the downlink signal quality information CQI.

13. A base station apparatus that transmits to a mobile station apparatus a downlink signal containing a downlink pilot channel, a downlink common control channel, a downlink shared control channel, and a downlink shared data channel, that receives from the mobile station apparatus downlink signal quality information CQI corresponding to reception quality of the downlink signal, and executes transmission control of data to the mobile station apparatus using the downlink signal quality information CQI, comprising:
- a downlink signal quality information CQI judging means that judges whether the downlink signal quality information CQI transmitted from the mobile station apparatus is present; and
- a downlink signal control means that transmits the downlink signal to the mobile station apparatus during an intermittent receivable period when the downlink signal quality information CQI judging means judges that the downlink signal quality information CQI is not present and data addressed to the mobile station apparatus is present in an RLC packet data buffer.

14. The base station apparatus as defined in claim 13, wherein
the downlink signal control means transmits data control information addressed to the mobile station apparatus and/or the data addressed to the mobile station apparatus during the pre-defined intermittent reception period.

15. The base station apparatus as defined in claim 13, wherein
the downlink signal control means uses a low order MCS mode defined in an AMC scheme in transmission of data addressed to the mobile station apparatus by the time when it is judged that the downlink signal quality information CQI provided as feedback from the mobile station apparatus is present, during the pre-defined intermittent reception period.

16. The base station apparatus as defined in claim 13, wherein
the downlink signal control means transmits only information on whether the data addressed to the mobile station apparatus is present, by the time when it is judged that the downlink signal quality information CQI provided as feedback from the mobile station apparatus is present, during the pre-defined intermittent reception period.

17. The base station apparatus as defined in claim 13, wherein
the downlink signal control means does not transmit the data addressed to the mobile station apparatus by the time when it is judged that the downlink signal quality information CQI provided as feedback from the mobile station apparatus is present, during the pre-defined intermittent reception period.

18. The base station apparatus as defined in claim 13, wherein
the downlink signal control means executes transmission control of data to the mobile station apparatus using an MCS mode defined in an AMC scheme according to the downlink signal quality information CQI.

19. A mobile communication system, comprising:
- a base station apparatus transmitting a downlink signal comprising a downlink pilot channel, a downlink common control channel, a downlink shared control channel, and a downlink shared data channel; and
- a mobile station apparatus setting an uplink control channel with the base station apparatus, measuring reception quality of the downlink signal, and transmitting downlink signal quality information CQI corresponding to the reception quality to the base station apparatus using the uplink control channel, the base station apparatus controlling transmission of data to the mobile station apparatus using the downlink signal quality information CQI, wherein the mobile station apparatus comprises:
- a reception data judging portion that judges whether data addressed to the mobile station is contained in the downlink signal transmitted by the base station apparatus, and
- a reception controller that enters an intermittent reception mode that stops transmission of the downlink signal quality information CQI, that causes a receiving portion to operate during a pre-defined intermittent reception period, that stops the operation of the receiving portion in periods other than the pre-defined intermittent reception period, when the reception data judging portion judges that no data addressed to the mobile station apparatus from the base station apparatus is present, and wherein the base station apparatus comprises:
- a downlink signal quality information CQI judging portion that judges whether the downlink signal quality information CQI transmitted from the mobile station apparatus is present, and
- a downlink signal controller that transmits the downlink signal to the mobile station apparatus during an intermittent receivable period when the downlink signal quality information CQI judging portion judges that the downlink signal quality information CQI is not present and data addressed to the mobile station apparatus is present in an RLC packet data buffer.

20. A mobile communication method comprising:
transmitting from a base station a downlink signal comprising a downlink pilot channel, a downlink common control channel, a downlink shared control channel, and a downlink shared data channel;
measuring at a mobile station apparatus a reception quality of the downlink signal;
transmitting from the mobile station apparatus a downlink signal quality information CQI corresponding to the reception quality to the base station apparatus using an uplink control channel; and
controlling, with the base station apparatus, transmission of data to the mobile station apparatus using the received downlink signal quality information CQI, wherein
the mobile station apparatus judges whether data addressed to the mobile station apparatus is present in the downlink signal transmitted by the base station apparatus and, when it is judged that no data addressed to the mobile station apparatus from the base station apparatus is present, enters an intermittent reception mode that stops the transmission of the downlink signal quality information CQI, causes a receiving portion to operate during a pre-defined intermittent reception period, and stops the operation of the receiving portion during periods other than the pre-defined intermittent reception period, and wherein
the base station apparatus judges whether the downlink signal quality information CQI transmitted from the mobile station apparatus is present and, when it is judged that the downlink signal quality information CQI is not present and data addressed to the mobile station apparatus is present in an RLC packet data buffer, transmits the downlink signal to the mobile station apparatus during an intermittent receivable period.

21. A method of using a mobile station comprising:
receiving a downlink signal including a downlink pilot channel, a downlink common control channel, a downlink shared control channel, and a downlink shared data channel;
measuring a reception quality of the downlink signal;
transmitting a downlink signal quality information CQI corresponding to the reception quality using an uplink control channel;
judging whether data addressed to the mobile station apparatus is present in the downlink signal, and
when it is judged that no data addressed to the mobile station is present in the downlink signal, entering an intermittent reception mode that:
- stops the transmission of the downlink signal quality information CQI,
- causes a receiving portion to operate during a pre-defined intermittent reception period, and
- stops the operation of the receiving portion during periods other than the pre-defined intermittent reception period.

22. A method of using a base station, comprising:
transmitting a downlink signal comprising a downlink pilot channel, a downlink common control channel, a downlink shared control channel, and a downlink shared data channel;
receiving, from a mobile station apparatus via an uplink control channel, a downlink signal quality information CQI corresponding to reception quality of the downlink signal at the mobile station apparatus;
controlling transmission of data to the mobile station apparatus using the received downlink signal quality information CQI;
judging whether the downlink signal quality information CQI received from the mobile station apparatus is present, and;
when it is judged that the downlink signal quality information CQI is not present and data addressed to the mobile station apparatus is present in an RLC packet data buffer, transmitting the downlink signal to the mobile station apparatus during an intermittent receivable period.

23. A mobile communication system comprising:
a base station apparatus that transmits a downlink signal comprising a downlink pilot channel, a downlink common control channel, a downlink shared control channel, and a downlink shared data channel, and that has a downlink signal controller that transmits data control information and/or data addressed to a mobile station apparatus during a pre-defined intermittent reception period; and
the mobile station apparatus, which sets an uplink control channel with the base station apparatus, measuring reception quality of the downlink signal, and transmitting downlink signal quality information CQI, corresponding to the reception quality, to the base station apparatus using the uplink control channel, the base station apparatus controlling transmission of data to the mobile station apparatus using the downlink signal quality information CQI, wherein
the mobile station apparatus comprises:
a reception data determination portion that determines whether data addressed to the mobile station apparatus is present in the downlink signal transmitted by the base station apparatus, and
a reception control portion that,
when the reception data determination portion determines that data addressed to the mobile station apparatus from the base station apparatus is present, causes a receiving portion to further operate in periods other than the pre-defined intermittent reception period, and receives the data addressed to the mobile station apparatus, and,
when the reception data determination portion determines that no data addressed to the mobile station apparatus is present during a predefined delay time, and no data is addressed to the mobile station apparatus from the base station apparatus, enters an intermittent reception mode that causes operation of the receiving portion to stop during periods other than the pre-defined intermittent reception period.

* * * * *